(12) United States Patent
Kops et al.

(10) Patent No.: US 12,553,016 B2
(45) Date of Patent: Feb. 17, 2026

(54) TISSUE MATURATION BIOREACTOR SYSTEMS WITH UNIFORM CELL DISTRIBUTION

(71) Applicant: DEKA Products Limited Partnership, Manchester, NH (US)

(72) Inventors: Zachary T. Kops, Aspen, CO (US); Michael C. Tilley, Amherst, NH (US); Andrew K. Capulli, Auburn, NH (US); Stuart A. Jacobson, Lexington, MA (US); Keira L. McGrath, Manchester, NH (US); Jamie L. Nesbitt, Manchester, NH (US)

(73) Assignee: DEKA Products Limited Partneship, Manchester, NH (US)

( * ) Notice: Subject to any disclaimer, the term of this patent is extended or adjusted under 35 U.S.C. 154(b) by 554 days.

(21) Appl. No.: 18/179,477

(22) Filed: Mar. 7, 2023

(65) Prior Publication Data
US 2023/0279322 A1    Sep. 7, 2023

Related U.S. Application Data

(60) Provisional application No. 63/268,940, filed on Mar. 7, 2022.

(51) Int. Cl.
*C12M 3/00*    (2006.01)
*C12M 1/00*    (2006.01)
(Continued)

(52) U.S. Cl.
CPC ............ *C12M 21/08* (2013.01); *C12M 23/24* (2013.01); *C12M 23/26* (2013.01); *C12M 23/38* (2013.01);
(Continued)

(58) Field of Classification Search
CPC .... C12M 21/018; C12M 23/24; C12M 23/26; C12M 23/38; C12M 23/42; C12M 23/44;
(Continued)

(56) References Cited

U.S. PATENT DOCUMENTS

| | | | |
|---|---|---|---|
| 2004/0043481 A1* | 3/2004 | Wilson | C12M 41/44 435/297.1 |
| 2008/0311650 A1* | 12/2008 | Jakob | C12M 25/14 435/395 |

(Continued)

FOREIGN PATENT DOCUMENTS

WO    2022010594 A1    1/2022

OTHER PUBLICATIONS

International Search Report mailed Jun. 6, 2023, in PCT Application No. PCT/US2023/063816, 15 pages.

*Primary Examiner* — Michael L Hobbs
(74) *Attorney, Agent, or Firm* — Mark E. Tetreault

(57) ABSTRACT

System and method for exercising cells and/or tissue in a sealed bioreactor. System includes a cartridge having a stretching means and a means to retain cells on a scaffold mounted within the cartridge during seeding. System includes a bioreactor including a sealed enclosure, the sealed enclosure housing the scaffold and the cartridge, the bioreactor enabling uniform seeding of the scaffold with the cells, the seeding occurring within the sealed enclosure to protect from environmental contamination. The bioreactor system provides a means to supply fresh media to the cells and/or tissue, and a means to remove waste products.

31 Claims, 38 Drawing Sheets

(51) Int. Cl.
   *C12M 1/04*     (2006.01)
   *C12M 1/12*     (2006.01)
   *C12M 1/42*     (2006.01)

(52) U.S. Cl.
   CPC ............ *C12M 23/42* (2013.01); *C12M 25/14* (2013.01); *C12M 35/04* (2013.01); *C12M 37/04* (2013.01)

(58) Field of Classification Search
   CPC ...... C12M 25/14; C12M 25/02; C12M 35/04; C12M 37/04; C12M 41/48; C12N 5/0068; C12N 5/0658
   See application file for complete search history.

(56) References Cited

U.S. PATENT DOCUMENTS

2011/0136225 A1\*  6/2011  Vunjak-Novakovic ..................... C12M 25/14 435/325
2020/0255789 A1   8/2020  Dendorfer \* cited by examiner

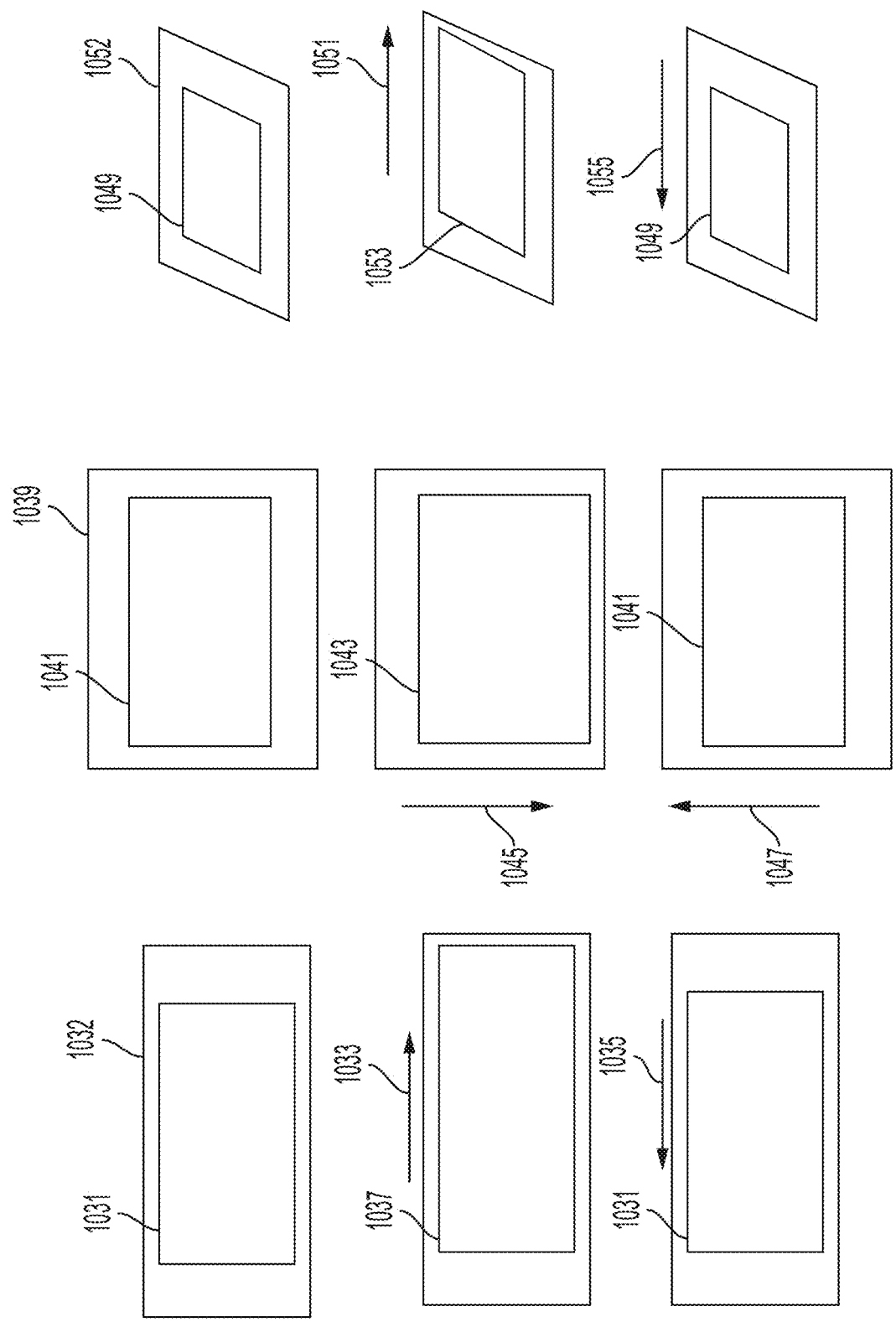

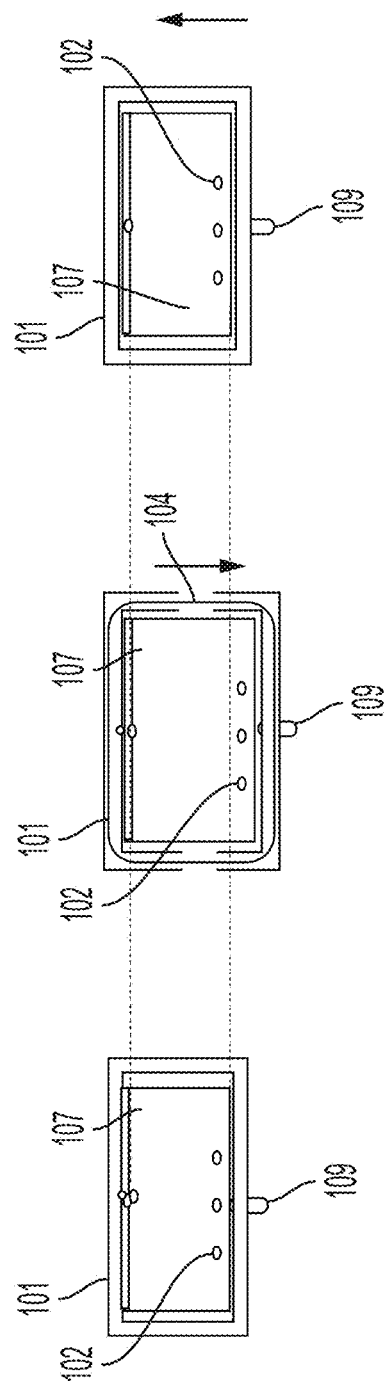

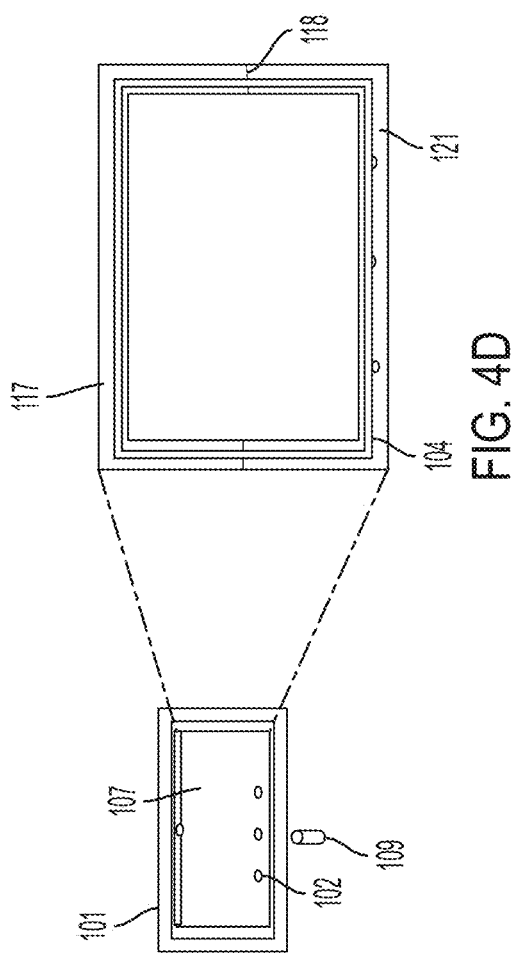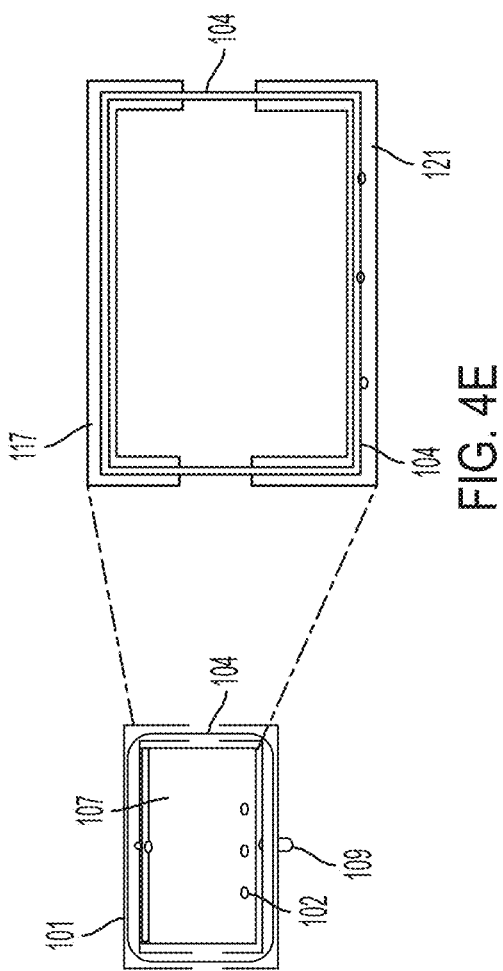

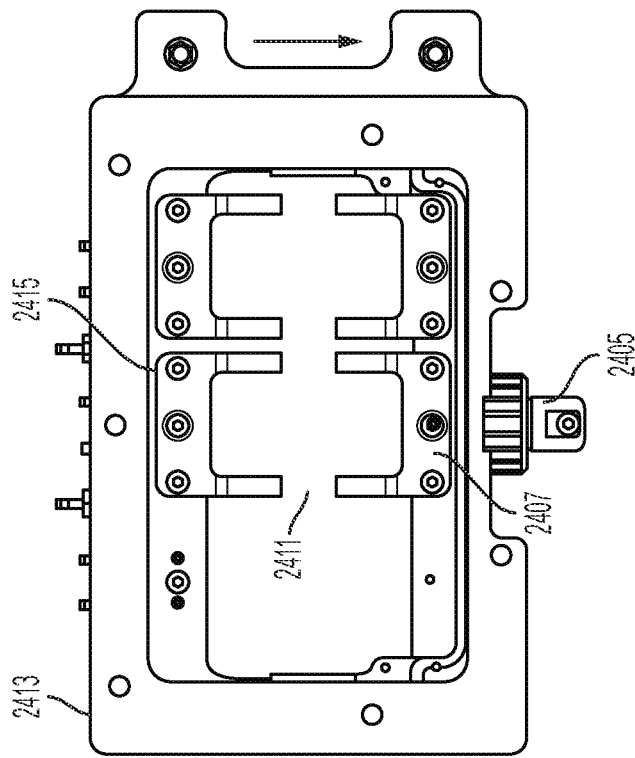
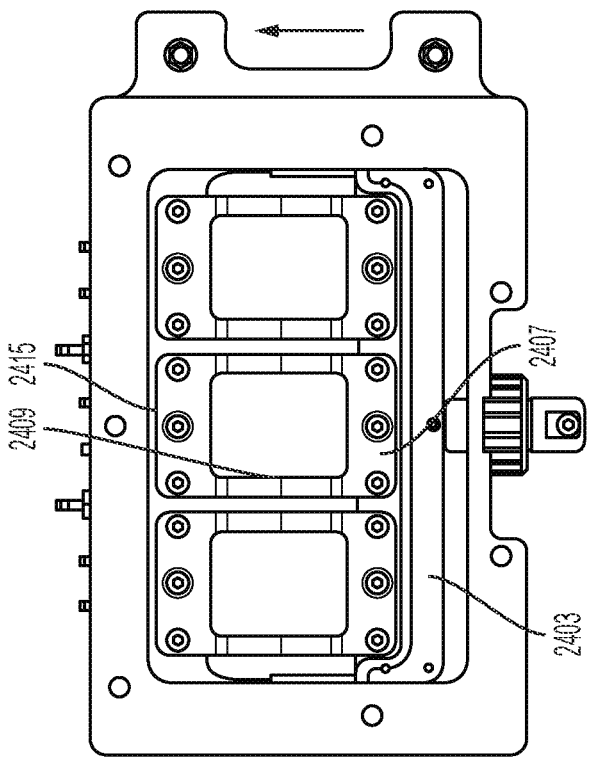
FIG. 7G
FIG. 7F

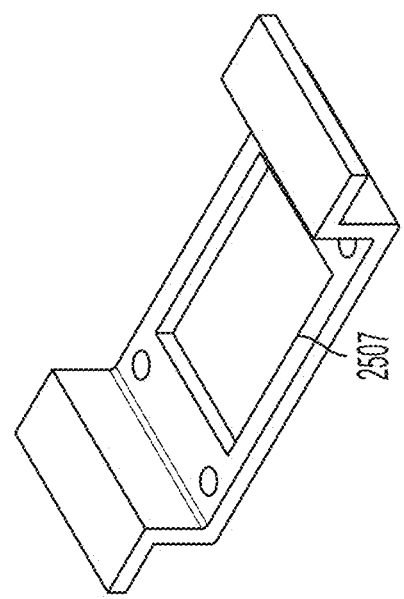
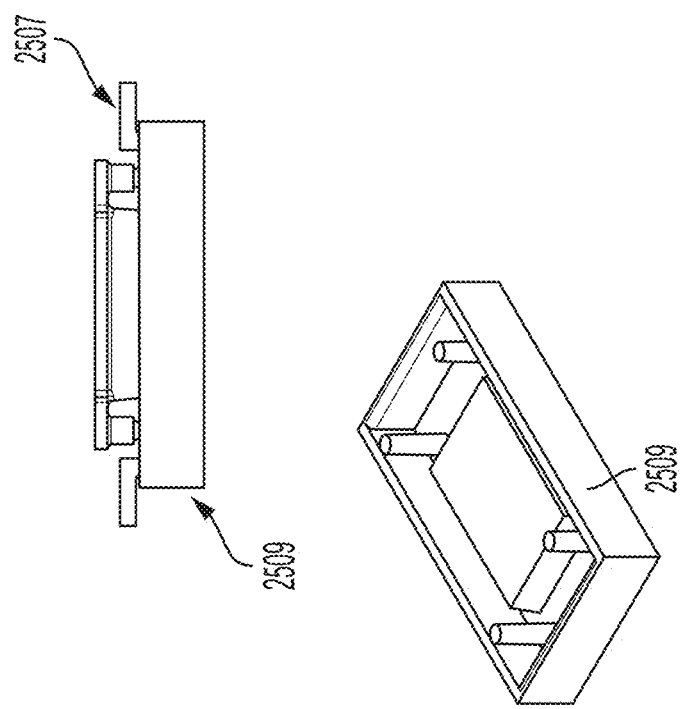
FIG. 8C

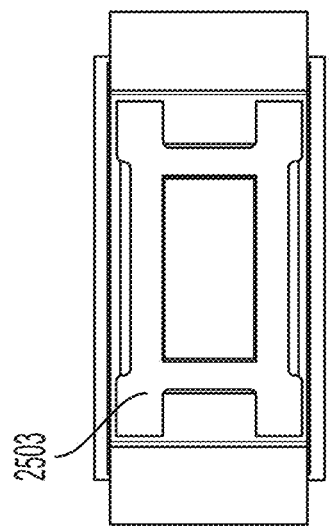
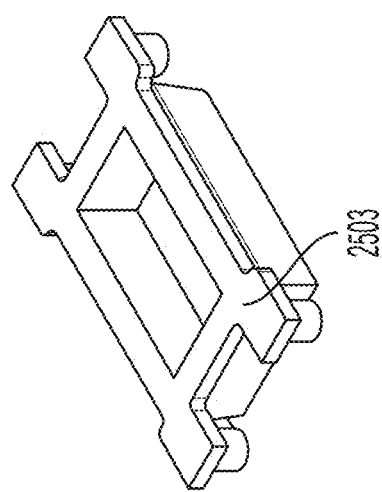
FIG. 8D

TISSUE MATURATION BIOREACTOR SYSTEMS WITH UNIFORM CELL DISTRIBUTION

CROSS REFERENCE TO RELATED APPLICATIONS

This application is a non-provisional of and claims priority to earlier filed U.S. Provisional Patent Application No. 63/268,940, filed Mar. 7, 2022 (AA708), the contents of which are incorporated herein by reference.

BACKGROUND

The present disclosure pertains to growing tissue, and specifically to exercising tissue as it grows to better simulate the dynamic mechanical environment in which actual living tissue matures from cells.

Tissue engineering relies on a scaffold, cells seeded on the scaffold, and the environment surrounding the scaffold and cells to produce viable and healthy tissue. The closer the environment is to what the tissue would experience in the body, the more likely it is that the tissue will develop into viability. One aspect of the environment involves simulating the mechanical stresses that the cells would undergo in the body. Current ways to simulate these stresses include stretch chambers, in which the stretch can be applied at a cyclic frequency.

Current systems provide stretch chambers to stretch cells. For example, cell stretching systems produced by Strex USA mechanically stimulate cells growing in culture by stretching and compressing them. The systems produced by Strex USA adhere cells to a stretch chamber and subject them to mechanical strain. The chambers are made from a silicone elastomer, for example, polydimethylsiloxane (PDMS). Other systems mechanically stimulate tissue forming cells to expose cells to mechanical stress by linear translation motion of a magnetic body in an added magnetic field (see JP2008/263986, El-Haj et al., Treatment of microorganisms or enzymes with electrical or wave energy, e.g. magnetism, sonic waves). Still other systems provide a culture container having gas-permeable sides and an extension unit for extending the culture container uniaxially in the horizontal direction. Such systems are designed to prepare fertilized eggs for implantation (see WO2007/052653, Naruse et al., Culture container and culture apparatus). Other systems provide bioreactors having mechanical actuators situated to mechanically stress tissues grown in the bioreactor. In such systems, the actuators apply vertical stress to tissues, and can even inflict injury (see Tuan et al., Modular, microfluidic, mechanically active bioreactor for 3D, multi-tissue, tissue culture, US2021/0139859). In some systems, the print-seeding process includes a cellularized 2% hyaluronic acid (HA) based hydrogel. (Christ et al., International Patent Publication #WO 2022/010594, Hermetically or Aseptically Sealed Bioreactor System and Related Method Thereof, published Jan. 13, 2020.) The HA hydrogel can be used to direct the even deposition of cells across the scaffolds, and minimize leakage and cell loss. The hydrogel dissolves into the culture media over time, and it is currently unknown if there are lasting effects of the temporary presence of HA on the development of the tissue engineering muscle repair product. In some systems, the print process requires multiple open processing steps, and the bioreactor can only be fully closed for exercise after both sides of the scaffolds are seeded. Open process steps are potential contamination risks.

What is needed is a system designed to accommodate a variety of scaffold materials and geometries, for example, but not limited to, decellularized bovine or porcine acellular matrix, decellularized collagen membrane, thin film polymer membranes (like PDMS) or a polymer fiber scaffold. What is needed is a system designed to remain closed to the environment after sterilization, which greatly reduces contamination risk and reduces manufacturing cost by requiring operation in expensive clean rooms. What is needed is a system that provides fluidic seeding of the scaffold inside the sealed bioreactor, which simplifies integration into a tissue foundry line, promoting process robustness and reducing manufacturing costs. What is further needed is the ability to use various kinds of scaffolds. What is further needed is a system that allows for closed, fluidic seeding via ports that are integrated with a cartridge within the sealed bioreactor. Exemplary components of a tissue foundry line are described in the following documents. Andrews et al., U.S. patent application Ser. No. 16/904,198, System and Method for Cell and Tissue Preparation, filed Jun. 17, 2020; Andrews et al., International Application #PCT/US20/38214, System and Method for Cell and Tissue Preparation, filed Jun. 17, 2020; Andrews et al., U.S. patent application Ser. No. 17/243,324, System and Method for Centralized Fluid Management and Culture Control, filed Apr. 28, 2021; Andrews et al., International Patent Application #PCT/US21/29706, System and Method for Centralized Fluid Management and Culture Control, filed Apr. 28, 2021; White at al., U.S. patent application Ser. No. 17/522,003, Cable/Tube Sleeve and Snorkel, filed Nov. 9, 2021; White et al., U.S. patent application Ser. No. 17/648,466, Modular, Configurable Bioreactor System for a Manufacturing Line, filed Jan. 20, 2022; White et al., International Application #PCT/US22/70265, Modular, Configurable Bioreactor System for a Manufacturing Line, filed Jan. 20, 2022; and White et al., Chinese Utility Model Application #202220160610.8, Modular, Configurable Bioreactor System for a Manufacturing Line, filed Jan. 20, 2022.

SUMMARY

In accordance with some configurations, the present teachings include a system and method for exercising tissue as it grows in a closed environment.

In the present disclosure, certain terminology is used. The following definitions are not intended to limit the scope of the disclosure, but instead to provide context and definition to the disclosure. Tissue Engineered Muscle Repair (TEMR) constructs refer to small skeletal muscle-like tissue. (Machingal, et al., A Tissue-Engineered Muscle Repair Construct for Functional Restoration of an Irrecoverable Muscle Injury in a Murine Model, Tissue Engineering: Part A, 17:17-18, 2011; Corona, et al., Implantation of In Vitro Tissue Engineering Muscle Repair Constructs and Bladder Acellular Matrices Partially Restore In Vivo Skeletal Muscle Function in a Rat Model of Volumetric Muscle Loss Injury, Tissue Engineering: Part A, 20:3-4, 2014; Corona, et al., Further Development of a Tissue Engineered Muscle Repair Construct In Vitro for Enhanced Functional Recovery Following Implantation In Vivo in a Murine Model of Volumetric Muscle Loss Injury, Tissue Engineering: Part A, 18:11-12, 2012) Fluidic seeding methods that are not reliant on printing of cellularized ink are referred to herein as "print-free". Individual seeded scaffolds are referred to as "samples". An enclosed scaffold unit framed in silicone elastomer or more preferably PDMS is referred to herein as an "encapsulated scaffold". A bioreactor designed to exercise multiple encapsulated scaffolds is referred to herein as the first configuration bioreactor (depicted in FIG. 5A et seq). Immortalized murine myoblast cell line is referred to herein as "C2C12". Metrics to assess cell seeding onto a scaffold are referred to herein as process parameters. The percent area of the scaffold covered by cells as determined by area fraction of actin stain is referred to herein as "coverage". Coherency and primary direction of cells as determined by actin fiber orientation is referred to herein as "alignment". Polydimethylsiloxane (silicone) is referred to herein as "PDMS".

The present disclosure pertains to the multi-surface seeding of human muscle progenitor cells onto acellular matrix scaffolds. The bioreactor of the present teachings facilitates print-free seeding within a closed environment to decrease contamination risk relative to the open-processing steps required in other systems. Seeding is followed by uniaxial stretch pre-conditioning in a fully enclosed bioreactor environment. In some configurations, the resulting TEMR constructs are ultimately intended to be surgically implanted to promote tissue regeneration and repair in instances of volumetric muscle loss. The system of the present teachings provides a hydrogel-free, print-free seeding method that yields comparable cell coverage to a print-seeding process. To minimize open processing steps, in the bioreactor of the present teachings, scaffolds can be fluidically seeded and exercised in a single, fully enclosed environment. The individual bioreactors consist of a closed shell with seeding ports integrated into a cartridge that holds a scaffold, or ports located on the bioreactor housing, an internal frame to hold multiple cartridges, and the necessary mechanisms to apply force onto the cartridges and therefore, the scaffolds. The bioreactor design also accommodates closed processing for any necessary media exchanges or continuous media flow throughout the process. TEMR constructs produced in the bioreactor meet or exceed pre-selected process parameters and thus can enable additional automation in the TEMR production process. The bioreactor includes ports to accommodate automated seeding and a continuous media flow loop. The efficacy of the system of the present teachings is illustrated by cell coverage on the seeded scaffold area of >90%, cell alignment across the seeded scaffold area (coherency) of ≥0.4, and cell alignment orientated primarily in the direction of stretch of 0°, as determined by fluorescent staining and analysis of cell body (actin) and nuclear fluorescent stains. Cells within the tissue need to be tightly distributed (coherency) in a desired direction (angle). Coherency of the cells refers to the alignment distribution of the actin cytoskeletons comprising the cells; coherency is 1 if all actin fibers are perfectly aligned in the tissue and 0 if isotropic. (Clemons et al, Coherency image analysis to quantify collagen architecture: implications in scar assessment, RSC Adv., 2018, 8, 9661 (Clemons)). According to Clemons, "the value of the coherency indicates the degree to which the local features are oriented: Coherency is 1 when the local structure has one dominant orientation and 0 if the image is isotropic in the analysed regions of interest." With respect to the system of the present teachings, local features are the actin fibers of the cells in a specified area of tissue: a pre-defined pixel x pixel area. Coherency for engineered muscle tissue analysis is important because muscle tissue in total is only as effective as its alignment. Cell lines that can be used to seed the bioreactors include, but are not limited to, C2C12 murine myoblasts, muscle progenitor cells, hMP cells, NHCN-M2 cells, mesoangioblasts, satellite cells, H2K cells, L8 rat cells, and 3T3 mouse embryonic fibroblasts.

One of the features of the system and method of the present teachings is that they can be used for limited cell volumes, making them economically attractive. In addition, low volumes enable detection of changes in the media and/or substances secreted by the cells/tissues as they grow. Among other things, detection of changes is important for continuous, non-invasive cell and tissue observation to monitor cell/tissue growth, maturation, harvest-ready status. Determining whether or not muscle tissue is ready for harvesting requires continuous monitoring of signals that indicate how the status of the tissue is changing over time.

Another feature of the system and method of the present teachings is that cells are provided to a scaffold and mature all in a single enclosure. The entire process, seeding and maturation, takes place inside the bioreactor of the present teachings so that cells are never outside of a controlled environment. No printing of cells is necessary, and thus no moving of the scaffold from the print location to the bioreactor. Because the number of cells to seed is relatively low, a device such as a specially-formulated syringe pump can be used to deliver the cells onto the scaffold.

BRIEF DESCRIPTION OF THE DRAWINGS

The foregoing features of the disclosure will be more readily understood by reference to the following description, taken with reference to the accompanying drawings, in which:

FIG. 1E is a schematic block diagram of the cartridge movement system of the present teachings;

FIGS. 4A-4E are schematic block diagrams illustrating stretching of the cartridge of FIGS. 2 and 3;

FIG. 5I illustrates various views of a schematic perspective diagram of the bioreactor subsystem of the implementation of FIG. 5A;

FIGS. 7F and 7G are top plan diagrams of the bioreactor subsystem of the implementation of FIG. 7A showing cartridges in both contracted and expanded form;

FIGS. 7N-7P are cross section diagrams showing the fluid flow of the implementation of FIG. 7A;

FIGS. 8A-8D are views of another embodiment of the cartridge of the present teachings.

DETAILED DESCRIPTION

Figure 1A:
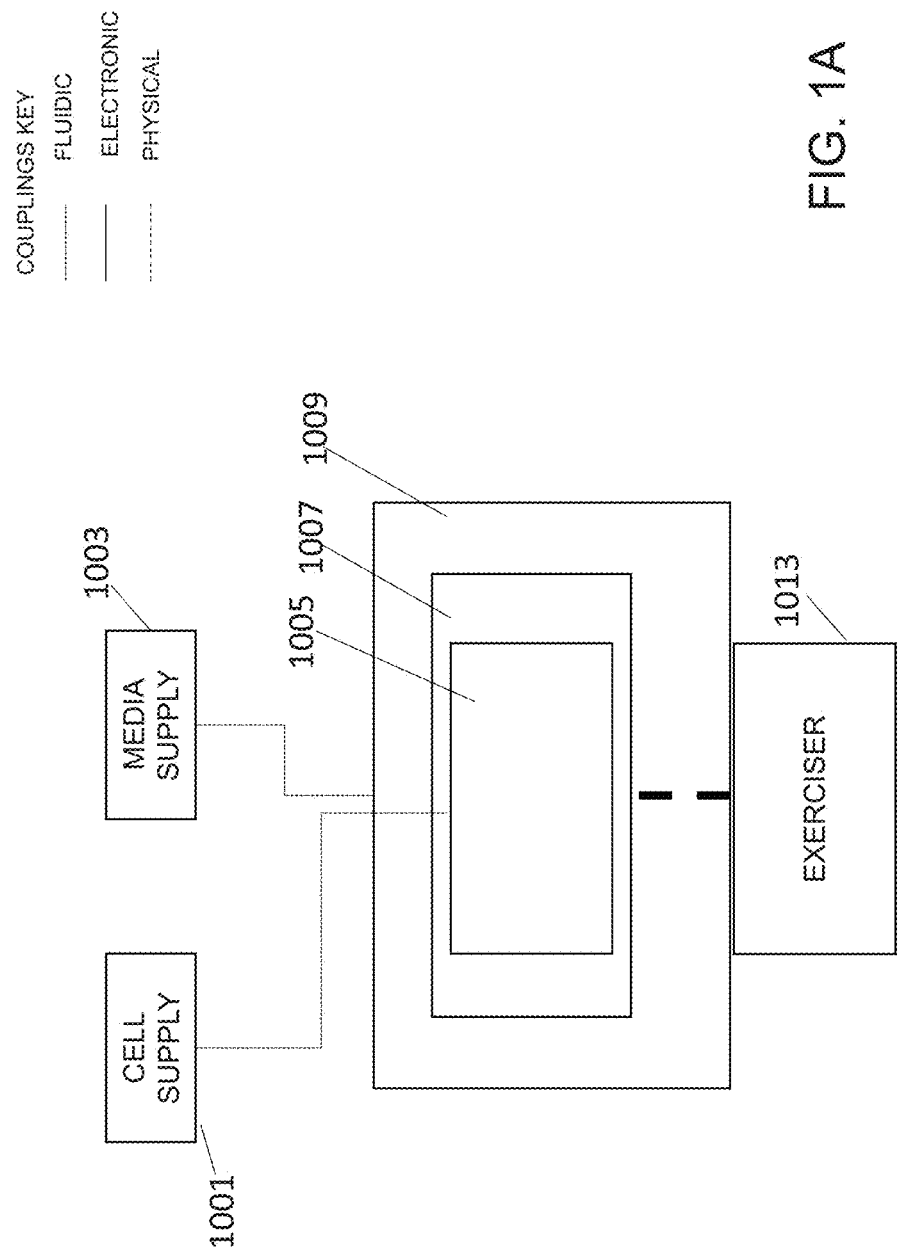
FIGS. 1A-1D are schematic block diagrams of the system of the present teachings for exercising tissue.
Figure 1B:
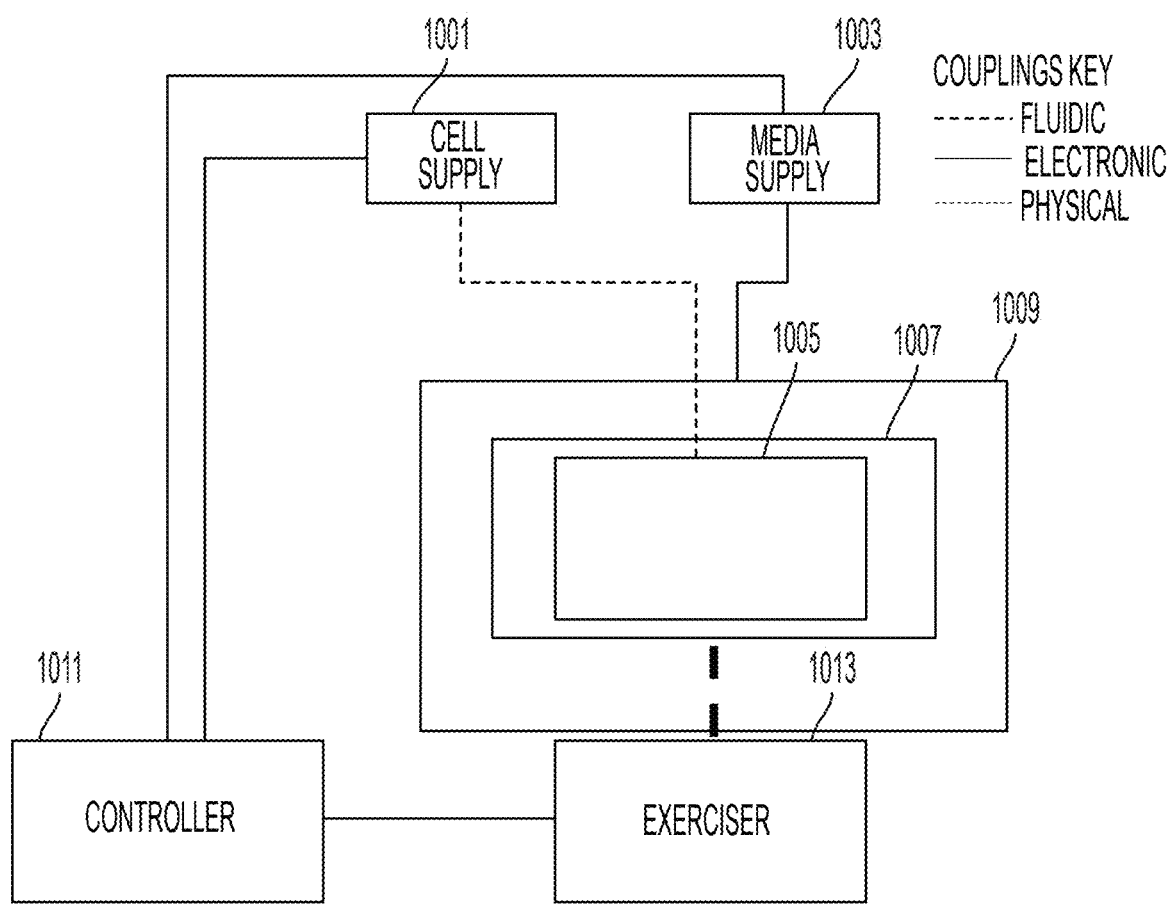

The system of the present teachings for print-free seeding and/or mechanical exercise within bioreactor for the production of TEMR constructs is described in detail herein. Specifically, the system and method of the present teachings can accommodate seeding cells onto a scaffold without need of a cell printing system, and can further mature the cells in a closed environment after they have been seeded onto the scaffold. The bioreactor of the present teachings can accommodate several scaffolds simultaneously, making it possible to mature, for example, but not limited to, human cells, a backup scaffold with the same human cells, and a control group of cells. Other configurations are contemplated by the present teachings, including configurations with a single scaffold, and configurations with two, three, or more scaffolds. The bioreactor is fully sterilizable and entirely closed prior to and during all production tests with live cells and tissues. The system and method of the present teachings can also mechanically exercise cells. This feature can be integrated with the cell seeding feature, or can exist separately from cell seeding and the closed environment. The exercise feature is enabled by the flexible scaffold contained within a specially-designed stretchable cartridge, a frame operably coupled with the stretchable cartridge to stretch the stretchable scaffold, and a push-pull mechanism controlled by a processor to enable controlled movement of the frame, thus stretching the tissue on the scaffold. The cartridge is configured to be consistent with a variety of scaffold materials and geometries, for example, decellularized bovine or porcine bladder acellular matrix. Other scaffold types include decellularized collagen membranes, thin film polymer membranes, and a polymer fiber scaffold. In some configurations, the scaffold can be framed in silicone. In some configurations, instead of silicone, split substantially rigid sides connected by a flexible and stretchable ring can form the top and bottom of a frame or cartridge. The frame or cartridge can surround the scaffold, and the split rigid or semi-rigid sides can be pulled apart to exercise the tissue on the scaffold. The cartridge and/or bioreactor can include a seeding port, and a lid. Other options for seeding include a seeding port in the frame or in a covering for the scaffold, or the lid, for example. The lid can have a solid or semi-flexible structure, and can be, for example, constructed of a clear material allowing observation of the scaffold and gas exchange. The clear material can include, for example, silicone. The gas exchange can occur within a sealed bioreactor. For example, media can be buffered for about 5% $CO_2$, a gas concentration that can be monitored and maintained by the bioreactor. The present teachings contemplate further options for the lid. Another feature of the present teachings is a device that pushes and pulls the cartridge assisting with exercising the tissue on the scaffold.

Figure 1C:
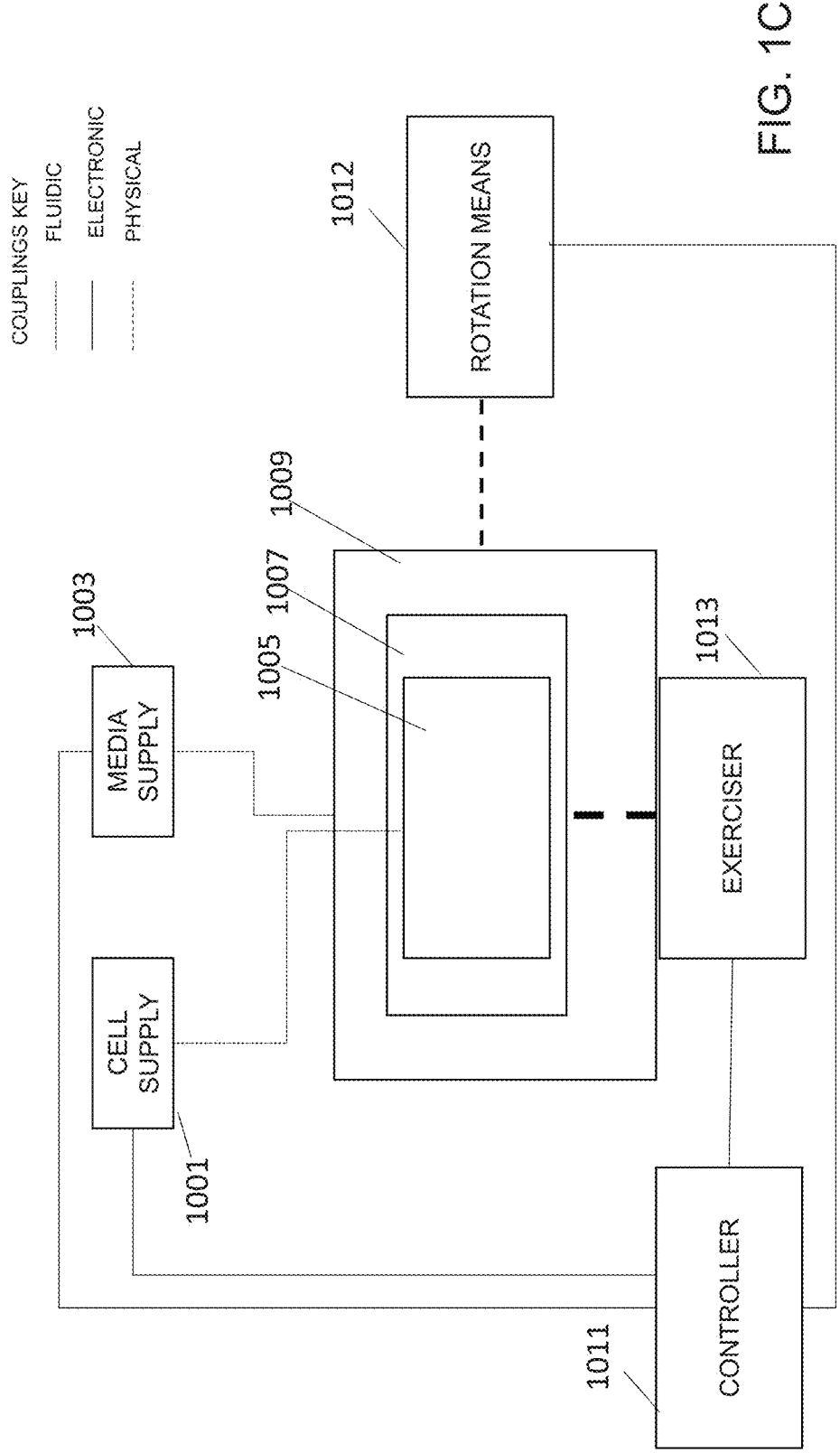
Figure 1D:
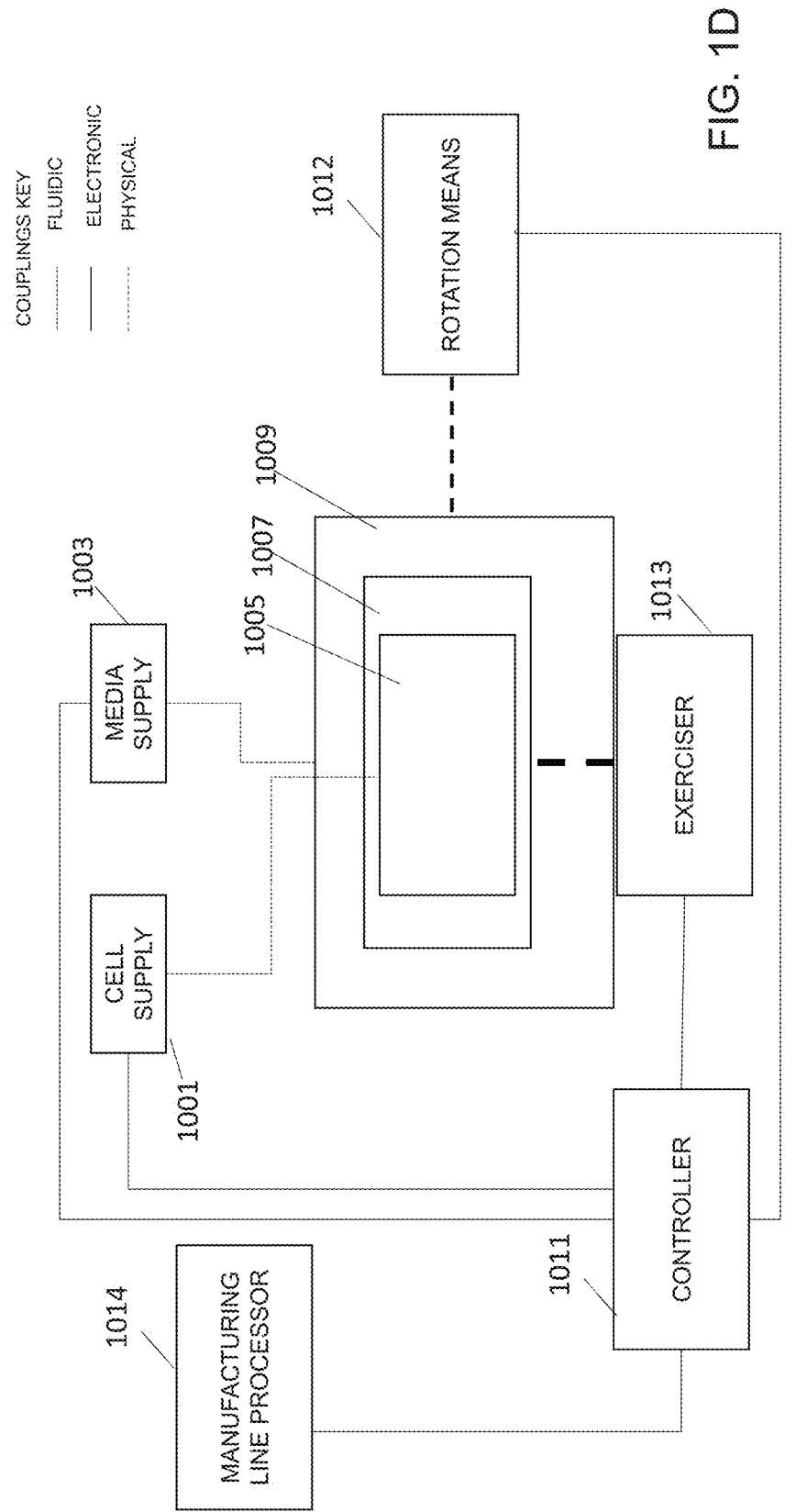

Referring now to FIGS. 1A-1D, the system of the present teachings for exercising tissue includes, but is not limited to including, scaffold 1005/1005A, cartridge 1007, bioreactor 1009, exerciser 1013 (FIG. 1B), and rotation means 1012 (FIG. 1C). Scaffold 1005 provides at least one surface upon which cells can be deposited and attach. Scaffold 1005 can take any shape, and cells can attach on any surface of scaffold 1005. For example, scaffold 1005 can include a first surface and a second surface, each of which can be populated by the same or different types of cells. The present teachings contemplate a multi-surfaced scaffold, possibly a 3-dimensional shape. The shape and size of scaffold 1005 dictate the shape and size of cartridge 1007 which forms a holding frame for scaffold 1005. Cartridge 1007 is constructed to grasp portions of scaffold 1005 and hold them in place while cartridge 1007 expands and contracts, effectively stretching and constricting scaffold 1005. Scaffold 1005 can be configured with cartridge 1007 to stretch/constrict along any axis appropriate for the tissue being exercised and any orientation that might be relevant, non-limiting examples of which are shown in FIG. 1A. Rotation means 1012 (FIG. 1C) can, responding to commands from controller 1011, rotate bioreactor 1009. Rotation can enable cell attachment, with the help of gravity or assisting force. The system of the present teachings can be part of a manufacturing line, and thus can be under the control of manufacturing line processor 1014 (FIG. 1D)

Referring now to FIG. 1E, exemplary scaffold 1031 encased in cartridge 1032 is stretched to the shape of scaffold 1037 in first direction 1033. The stretch retreats in second direction 1035, and scaffold 1031 returns to its original shape and size. At a second orientation, exemplary scaffold 1041 encased in cartridge 1039 is stretched to the shape of cartridge 1043 in third direction 1045. As the stretch retreats in fourth direction 1047, scaffold 1041 returns to its original shape and size. At a third orientation, scaffold 1049 encased in cartridge 1052 is stretched to the shape of cartridge 1053 in fifth direction 1051. As the stretch retreats in sixth direction 1055, scaffold 1049 returns to its original shape. The present teachings contemplate other shapes, orientations, and dimensions, all of which can be accommodated by the system described herein.

Referring again to FIGS. 1A-1D, scaffold 1005 can be seeded manually within bioreactor 1009, and/or automatically seeded with cells from cell supply system 1001. Cell supply system 1001 can include a single type of cell, or multiple types of cells separated from each other and dispensed separately. Cell supply system 1001 includes a means to move the cells from cell chambers within cell supply system 1001, for example, but not limited to, a pumping mechanism. Another cell move option is a linear actuator moving a syringe needle that deposits a pre-selected amount of cells in pre-selected locations on scaffold 1005. In configurations in which scaffold 1005 is automatically seeded, controller 1011 communicates the cell type and seed amount to a cell supply system controller which in turn controls the cell move option.

Continuing to refer to FIGS. 1A-1D, media can be supplied to bioreactor 1009 by media supply system 1003. Media supply system 1003 includes at least one media type that is formulated based on the cells being seeded. When multiple cell types are seeded on various surfaces of scaffold 1005, multiple types of media may be needed. Also, at various times during the stretching process, different types of media might be needed. Media supply system 1003 includes a means to move the media from at least one media reservoir to bioreactor 1009. Media can include, for example, a complement of amino acids, vitamins, inorganic salts, glucose, and serum as a source of growth factors, hormones, attachment factors, and dissolved gas. Media can circulate around bioreactor 1009 and cartridges 1007 to maintain the viability of the cells seeded on scaffolds 1005 as the cells are stretched. Controller 1011 communicates the amount and type of media to the media movement means, the type of media is selected, and the media is moved to bioreactor 1009. The system can include a drain to either dispose of used media, or recirculate it and possibly condition it for reintroduction into bioreactor 1009.

Continuing to still further refer to FIGS. 1A-1D, the system of the present teachings includes exercise system 1013. Exercise system 1013 is physically configured to expand cartridge 1007, which, in turn, stretches scaffold 1005, while remaining in the closed system of the present teachings. In some configurations, exercise system 1013 includes magnetic couplings that respond to pressure from a motorized linear actuator that pulls cartridge 1007 to stretch. In some configurations, exercise system 1013 includes a braking device that holds cartridge 1007 in a stretched position, when necessary, to complete an exercise plan. The braking device can be automatically or manually activated. In other configurations, force sensors are employed during the stretching/exercise of the tissue to measure the resistance/stiffness of the tissue. In some configurations, the extent to which the tissue is stretched is limited based on measurements received from the force sensors.

Figure 3:
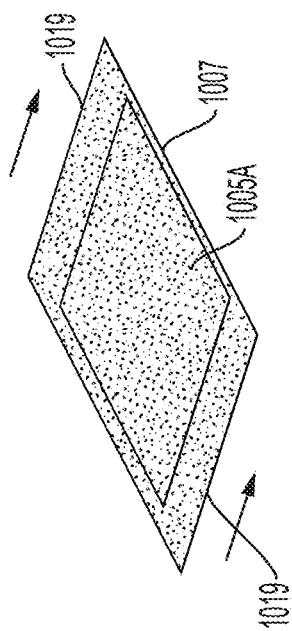
FIGS. 2 and 3 are schematic block diagrams illustrating details of a possible implementation of the cartridge of the present teachings.
Figure 2:
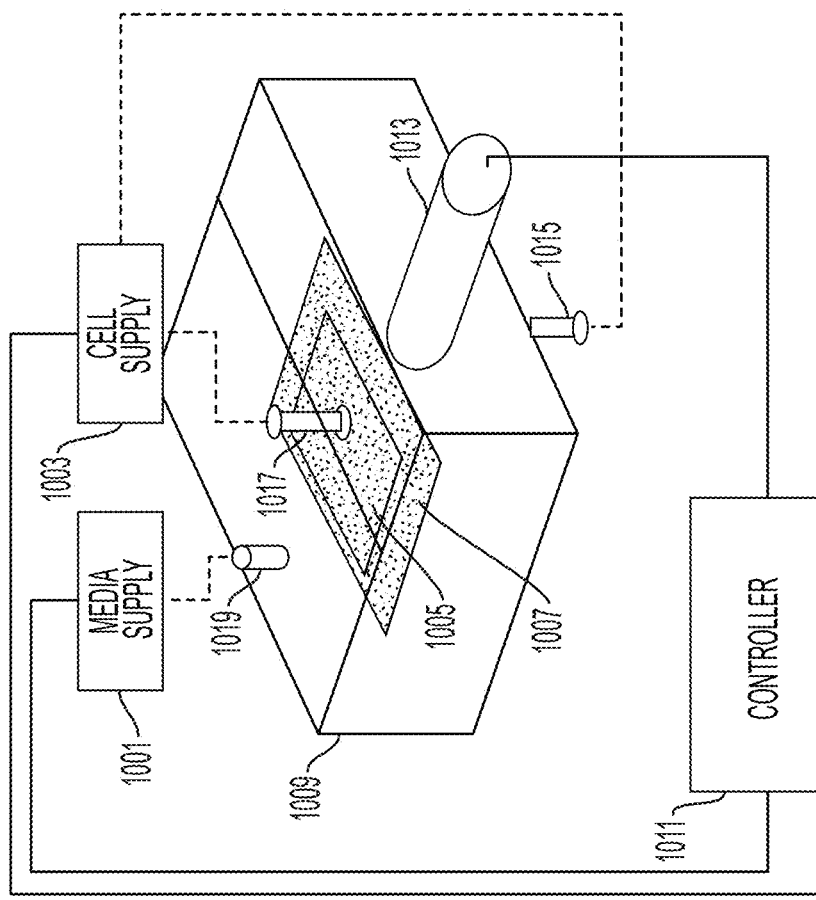

Referring now to FIGS. 2 and 3, an exemplary perspective 3-dimensional block diagram view of the system of the present teachings illustrates exemplary cell supply connectors 1017 and media supply connector 1019. Exemplary cell supply connectors 1015 are configured to seed cells to both sides of scaffold 1005. Connectors such as luer lock connectors can maintain the closed nature of the system of the present teachings. In some exemplary uses, scaffold 1005 can be mounted into cartridge 1007, and the combination is further mounted into bioreactor 1009. Controller 1011 directs cell supply system 1003 to seed cells onto scaffold 1005, possibly on both sides. Controller 1011 directs media supply system 1001 to provide media to bioreactor 1009. When the cells have reached a desired level of confluence, controller 1011 directs exercise means 1013, which is configured to be sealed from the environment when coupled with cartridge 1007, to stretch cartridge 1007, and therefore scaffold 1005A, as shown in FIG. 3. In an aspect, cartridge 1007 is configured with at least one flexible ring so that when sections of cartridge 1007 expand, spaces 1019 reveal the at least one flexible ring that stretches but retains cartridge part alignment so that cartridge 1007 can return to its original configuration, thus completing an exercise cycle.

Referring now to FIGS. 4A-4E, an exemplary configuration of the cartridge system of the present teachings is shown. Shown in FIGS. 4A and 4D are initial geometries of cartridge 107, and pull bar connectors 102. As in FIGS. 4B and 4D, when exercise means 109 pulls the push/pull mechanism (not shown), attached to cartridge 101 by connectors 102, cartridge 101 splits at seams 118, forming sides 117 and 121, and scaffold 107 and flexible ring 104 stretch. Scaffold 107 can be retained in the expanded position shown in FIGS. 4B and 4E by a brake apparatus (not shown), or when exercise means 109 releases tension on the push/pull mechanism, cartridge 101 and scaffold 107 return to their original position as shown in FIG. 4C.

Figure 5A:
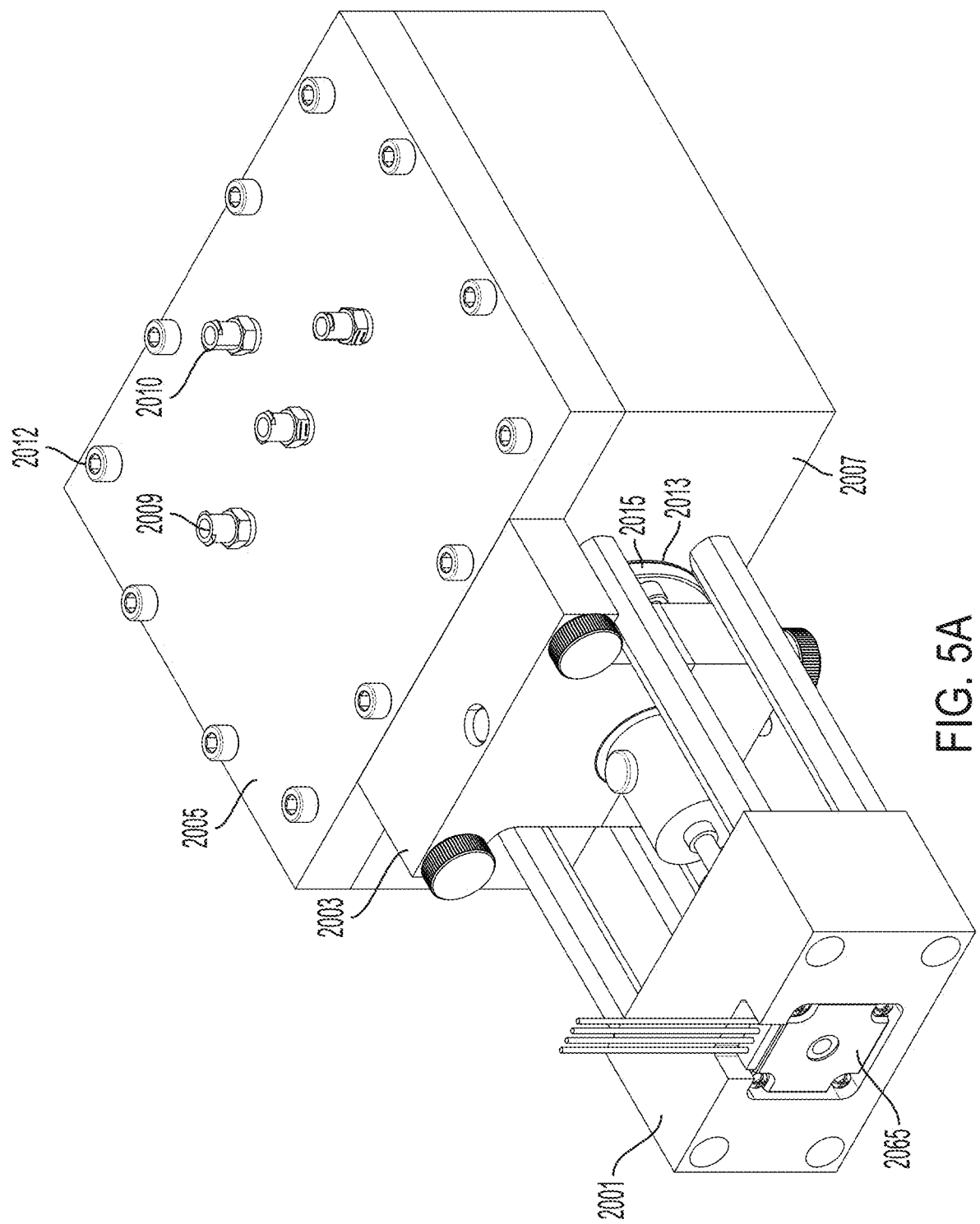
FIG. 5A is a schematic perspective diagram of an implementation of the system of the present teachings.

Referring now to FIGS. 5A-5I, a first implementation of the bioreactor, exercise means, and lockout brake means of the present teachings is shown. In this implementation, the bioreactor is configured in two parts, bioreactor top 2005 (FIG. 5A) and bioreactor base 2007 (FIG. 5A). Connectors 2012 (FIG. 5A) secure top 2005 (FIG. 5A) to base 2007 (FIG. 5A) to protect the contents of the bioreactor from environmental contamination. Other configurations are contemplated for the bioreactor of the present teachings. For example, the bioreactor can include two side sections that meet and are connected in the middle, or four corner sections that operably couple with one another to form, after connectors are in place, a sealed container. The bioreactor can be cylinder-shaped, with top and bottom sections or side sections operably coupled, or other geometric shapes chosen to accommodate specific scaffold and cartridge shapes and sizes, the scaffold and cartridges being housed by the bioreactor. Coupled with the bioreactor, through connected flange 2015, is motorized device case 2001 (FIG. 5A) that covers the mechanism that pulls and releases the cartridge within the bioreactor to enable exercise of the tissue on the scaffold in the bioreactor. Seal 2013 (FIG. 5A) between flange 2015 (FIG. 5A) and the bioreactor serves to seal the contents of the bioreactor from environmental contamination.

Figure 5B:
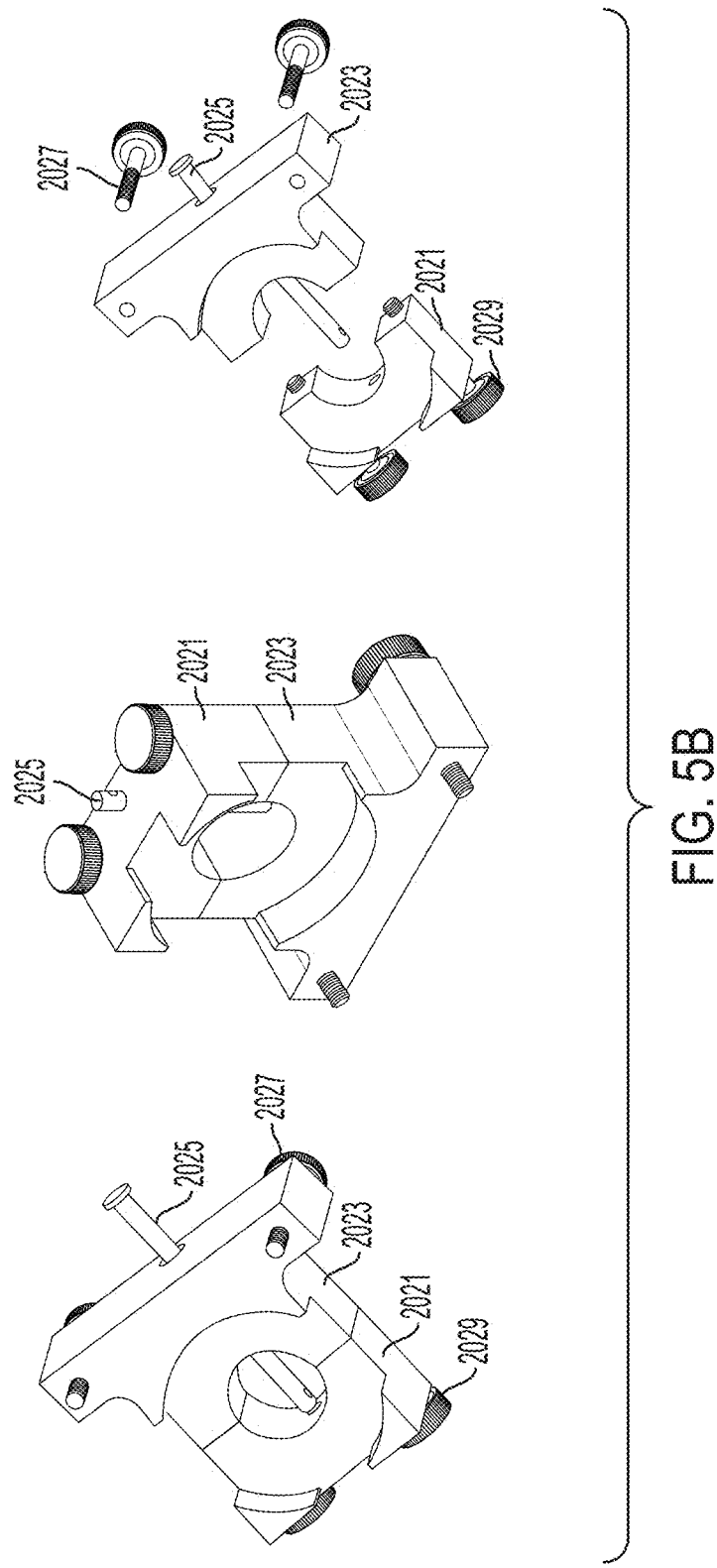
FIG. 5B illustrates schematic perspective diagrams of an implementation of the lockdown device of the present teachings.

Referring now primarily to FIGS. 5A and 5B, the bioreactor is operably coupled with lockout brake 2003 (FIGS. 5A and 5B), which can retain the cartridge in a desired position. In an aspect, lockout brake 2003 (FIGS. 5A and 5B) is configured in two parts, for example, but not limited to, lockout brake top 2023 (FIG. 5B) and lockout brake bottom 2021 (FIG. 5B). Thumb screws 2029 (FIG. 5B) operably couple lockout brake 2023 (FIG. 5B) with lockout brake bottom 2021 (FIG. 5B). Lockout brake 2003 (FIGS. 5A and 5B) is configured to surround motorized device case 2001 (FIG. 5A) to enable operable coupling between lockout device 2003 (FIGS. 5A and 5B) and the device enclosed in motorized device case 2001 (FIG. 5A). In an aspect, the coupling is secured by a connector such as, for example, but not limited to, clevis pin 2025 (FIG. 5B) fitting into compatible cavity 2006 (FIG. 5C) in the mechanism partially enclosed by motorized device case 2001 (FIG. 5A). In an aspect, lockout device 2003 (FIGS. 5A and 5B) is operably coupled with bioreactor 2005 (FIG. 5A) by thumb screws 2027 (FIG. 5B). The present teachings contemplate other configurations such as, for example, an internal lockout mechanism that is controlled remotely. This lockout mechanism can include sensors that detect various levels of tissue stretch and provide those data to a controller which can temporarily or permanently disable the device partially enclosed by motorized device case 2001 (FIG. 5A) from further exercise. In an aspect, the lockout mechanism can engage with the cartridge. In an aspect, no lockout mechanism is required because the controller determines the cartridge position and feeds that information to a controller associated with the motorized device, assuring that the tissue exercise regime starts and stops at pre-determined times, or dynamically-determined times, or a combination.

Figure 5C:
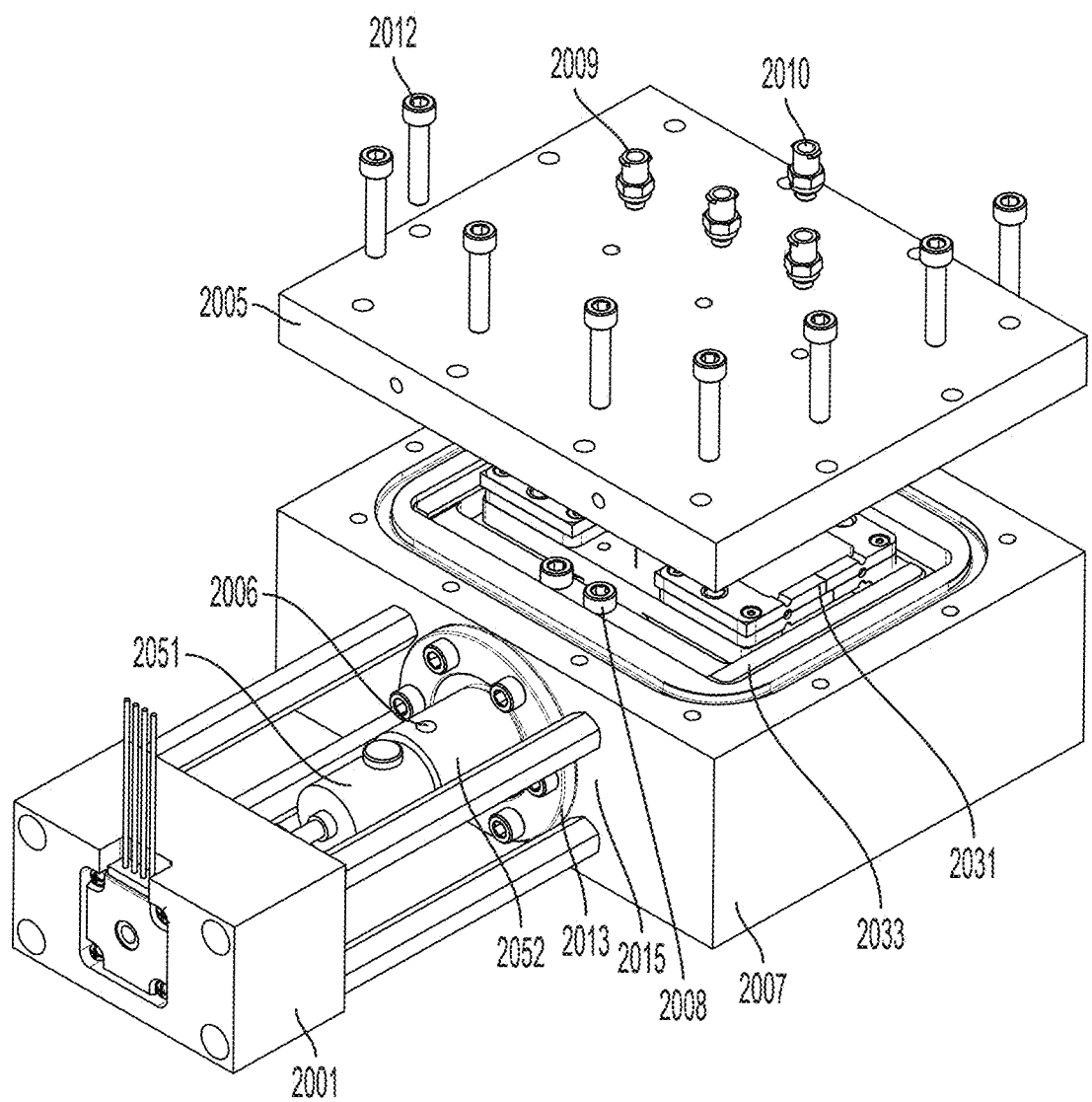
FIG. 5C is an exploded schematic perspective diagram of the implementation of FIG. 5A.
Figure 5D:
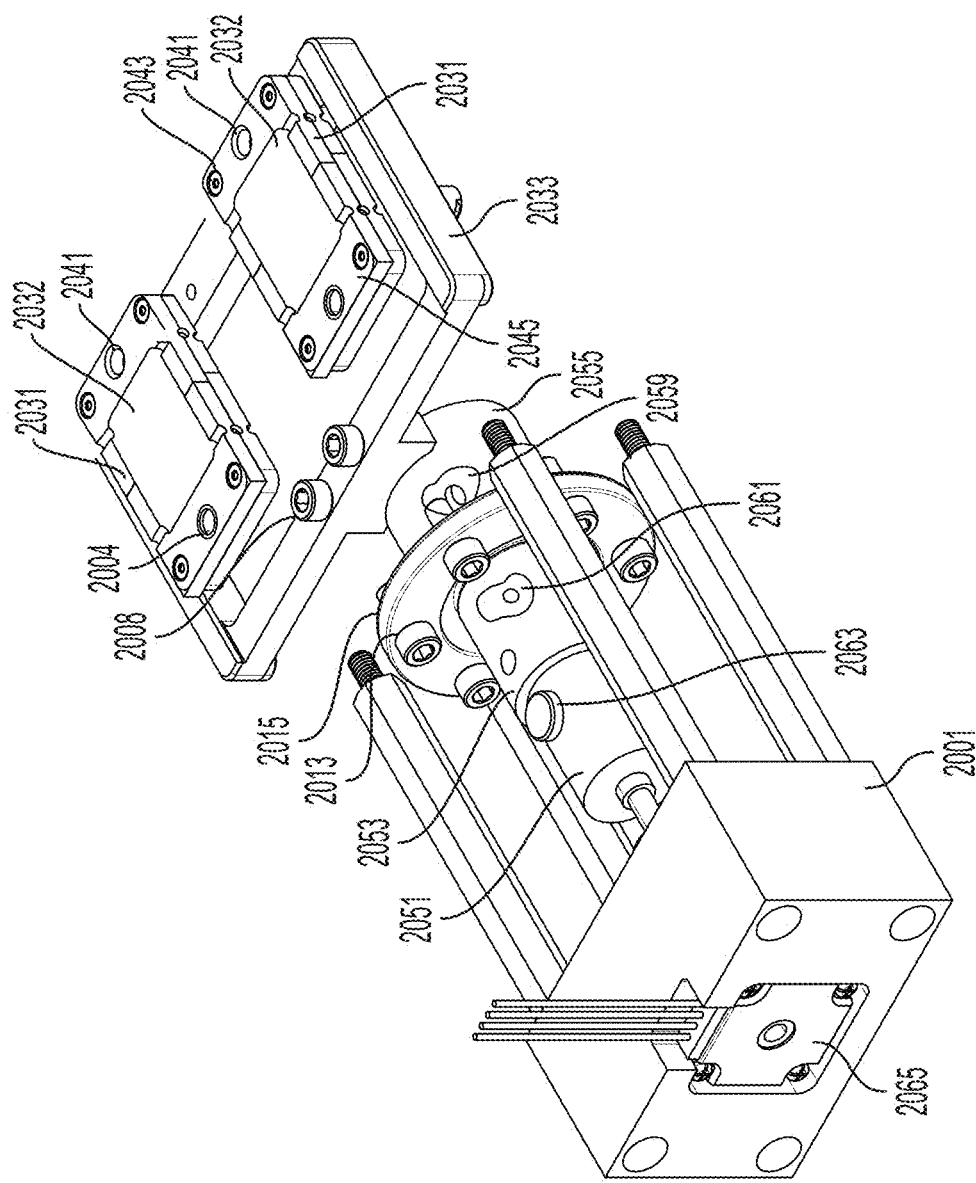
FIG. 5D is a schematic perspective diagram illustrating the linkage between the motor subsystem and the cartridges of the implementation of FIG. 5A.

Referring now to FIG. 5C, removing bioreactor top 2005 reveals the contents of the bioreactor. The geometry of bioreactor bottom 2007 is configured to provide secure seating for push/pull mechanism 2033 and cartridges 2031. In an aspect, a bioreactor with a more expansive footprint than the depicted bioreactor can provide seating for more cartridges 2031 and a larger push/pull mechanism 2033. The depicted bioreactor, providing seating for three cartridges 2031 (two cartridges 2031 are depicted) is exemplary only. Further the size and shape of the exercise area is dependent upon the desired type, extent, and direction of tissue exercise. Automatic or manual cell seeding is conducted into the closed bioreactor through luer lock connectors 2009, one for each side of each scaffold 2032 (FIG. 5D) mounted in cartridge 2031. The present teachings contemplate other configurations. In an aspect, multiple seeding ports per scaffold side can be configured, and can provide various cell types to various parts of the scaffold. In an aspect, scaffold 2032 (FIG. 5D) can include more than two sides, for example, can be a 3-dimensional figure, and a seeding port could be required for each surface of scaffold 2032 (FIG. 5D). In an aspect, a single seeding port can accommodate multiple scaffold surfaces by delivering the same cell type to each surface and/or by delivering different cell types to different scaffold surfaces sequentially. In some configurations, push/pull mechanism 2033 is operably coupled with the motorized device, for example, using connectors 2008, and to cartridges 2031 by connectors 2041 (FIG. 5D). Cartridges 2031 can be further operably coupled with bioreactor base 2007 by connector 2004. In this way, when push/pull mechanism 2033 moves, cartridge first edge 2043 moves, while cartridge second edge 2045 remains stationary, forcing the sides of cartridges 2031 to separate and forcing scaffolds 2032 (FIG. 5D) to stretch. Any form of coupling can be used, and/or cartridges 2031 can be formed as one piece with push mechanism 2033 on one end of cartridges 2031. Conversely, cartridges 2031, or parts of cartridges 2031 can be formed as one piece with bioreactor base 2007, so long as one edge of cartridge 2031 is free to move with push mechanism 2033.

Figure 5E:
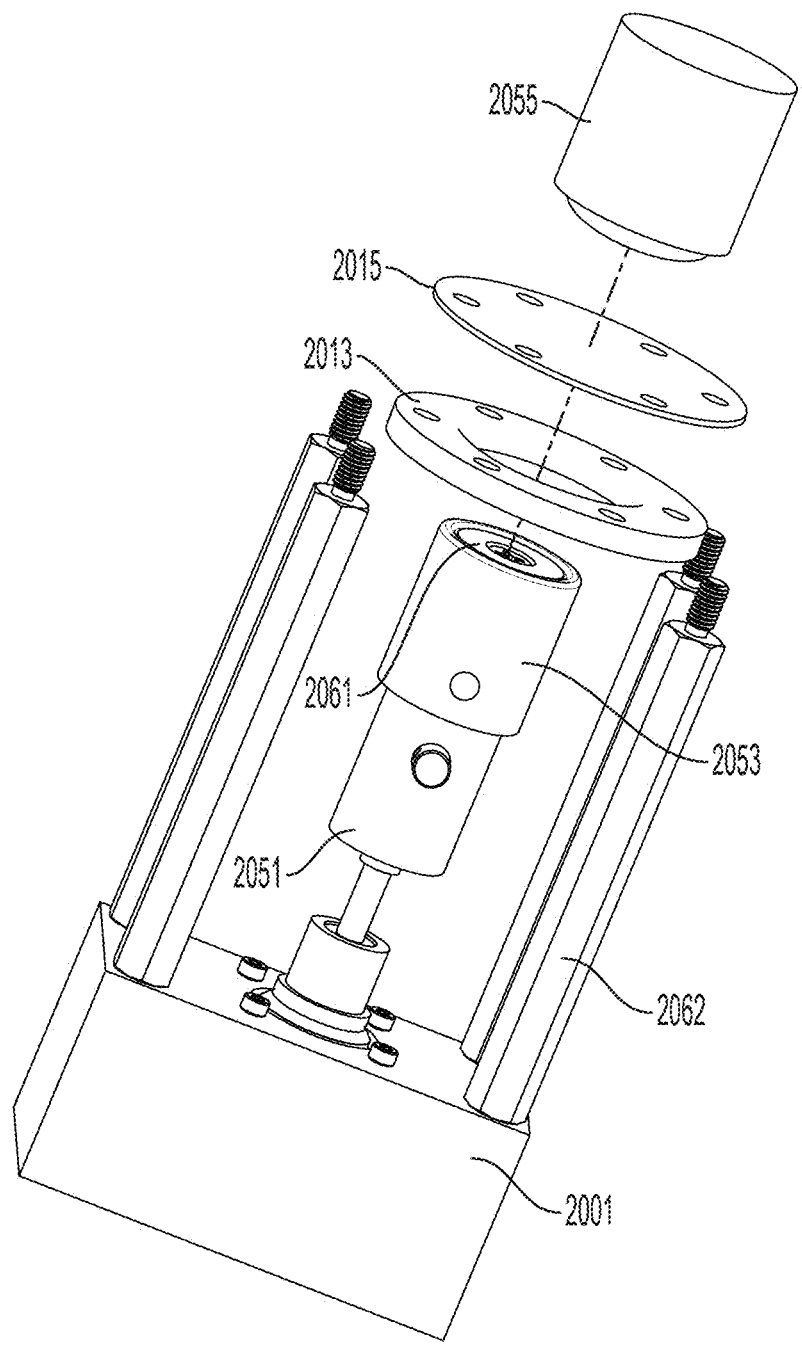
FIG. 5E is an exploded schematic perspective diagram of the environmental contamination protection of the implementation of FIG. 5A.
Figure 5F:
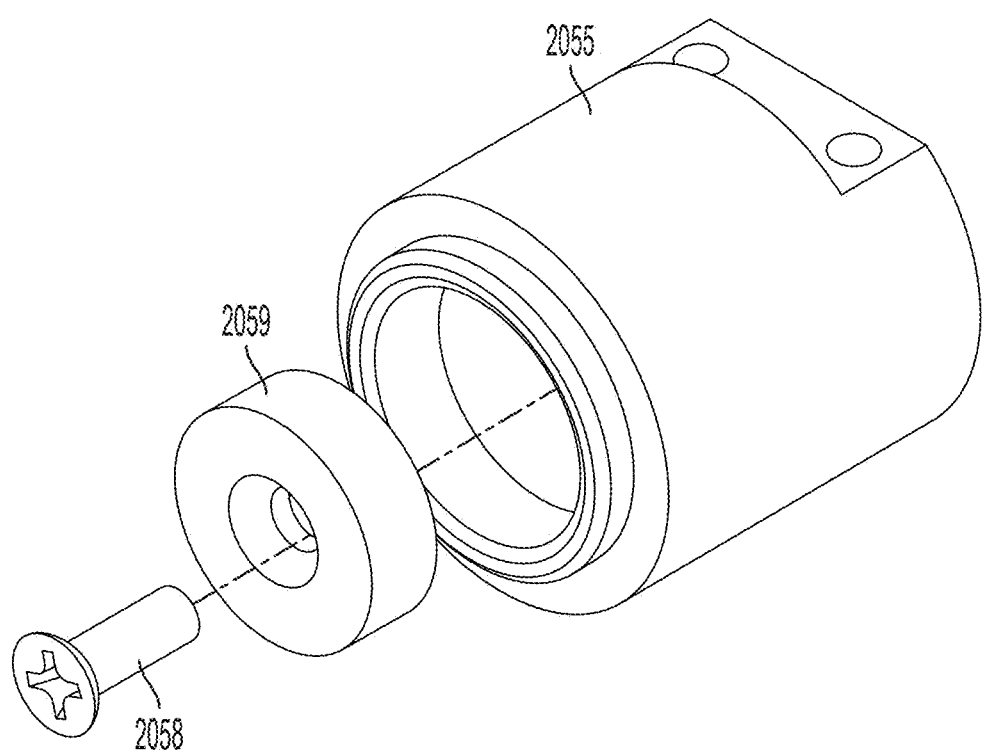
FIG. 5F is an exploded schematic perspective diagram of the magnet cap and magnet of the implementation of FIG. 5A.
Figure 5G:
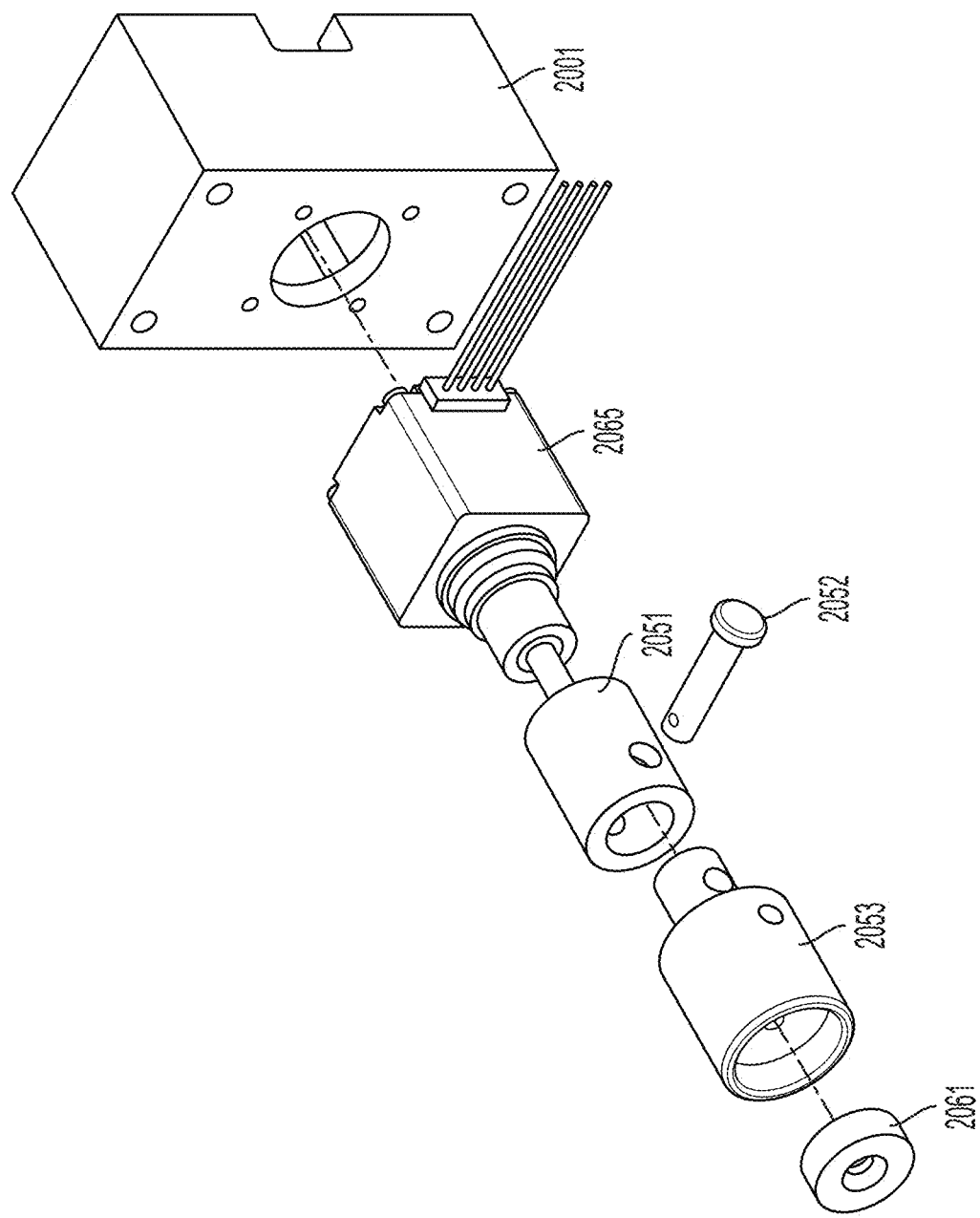
FIG. 5G is an exploded schematic perspective diagram of the motor subsystem of the implementation of FIG. 5A.

Referring now to FIGS. 5E-5G, the parts of an exemplary motorized device are shown. The motorized device moves push/pull mechanism 2033 (FIG. 5D) as discussed herein. Specifically, motorized device case 2001 (FIG. 5A), positioned with respect to the bioreactor by standoffs 2062 (FIG. 5E), partially encases linear actuator 2065, which couples with motor/magnet coupling 2051 (held in place by pin 2063), magnet/motor coupling 2053, and magnet 2061. Flange 2013 and diaphragm 2015 couple the motorized device with bioreactor 2007 (FIG. 5A). In the depicted configuration, linear actuator 2065, when driven by a motor, urges magnet 2061 (FIG. 5E), through couplings 2051 and 2053, towards opposing magnet 2059 (FIG. 5F), held in place by connector 2058 (FIG. 5F). Magnet 2059 (FIG. 5F) is mounted in magnet coupling 2055 (FIG. 5F), which is coupled with push/pull mechanism 2033 (FIG. 5D). Cartridges 2031 (FIG. 5D) are pulled towards the motorized device when the magnets engage, removing any tension in the scaffold and positioning the scaffold in the relaxed state. The magnets transmit the positive displacement of the motor to the cartridge and exert a push on cartridges 2031 (FIG. 5D), the edges of cartridges 2031 (FIG. 5D) become disengaged from each other, a flexible ring connecting the parts of cartridges 2031 (FIG. 5D) stretches, and scaffolds 2032 (FIG. 5D) stretch. When cartridges 2031 (FIG. 5D are moved in the opposite direction when linear actuator 2065 pulls the coupled magnets in the opposite direction, the edges of cartridges 2031 (FIG. 5D) re-engage, the flexible ring reverts to a static, non-stretched form, and scaffolds 2032 (FIG. 5D) relax. The flexible ring may be a band, and O-ring or any other suitable retainer that allows the cartridge to be stretched and return to its original position. The present teachings contemplate other configurations for the movement mechanism. For example, servo motors, stepper motors, actuators based on pneumatics or vacuum can replace the linear actuator, and magnets can be replaced, for example, by weights. The motor enclosure can be decoupled from the bioreactor base to enable transfer of the bioreactor base from place to place. One method for decoupling the motor enclosure from the bioreactor base can include clevis pin 2052 which can release the magnet motor coupling from the motor magnet coupling and enable the attachment of a lockout plate (shown in FIG. 5B) that can disable further movement of the tissue. The bioreactor magnetic coupling can be coupled to the motor enclosure with a diaphragm flange and a bioreactor diaphragm, which together seal contents of the bioreactor from environmental contamination while enabling energy transfer from the motor subsystem to the cartridges.

Figure 5H:
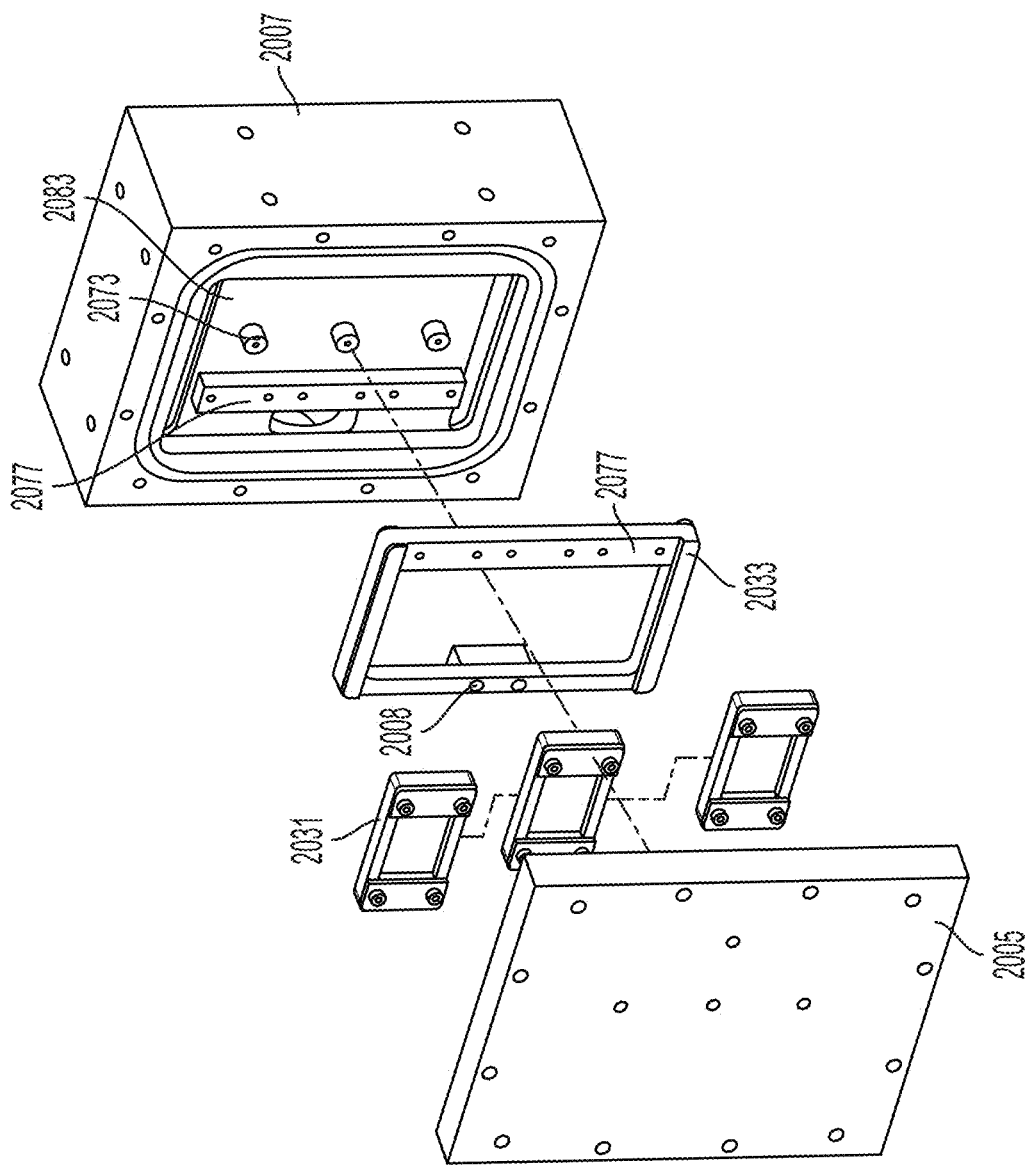
FIG. 5H is an exploded schematic perspective diagram of the bioreactor subsystem of the implementation of FIG. 5A.
Figure 51:
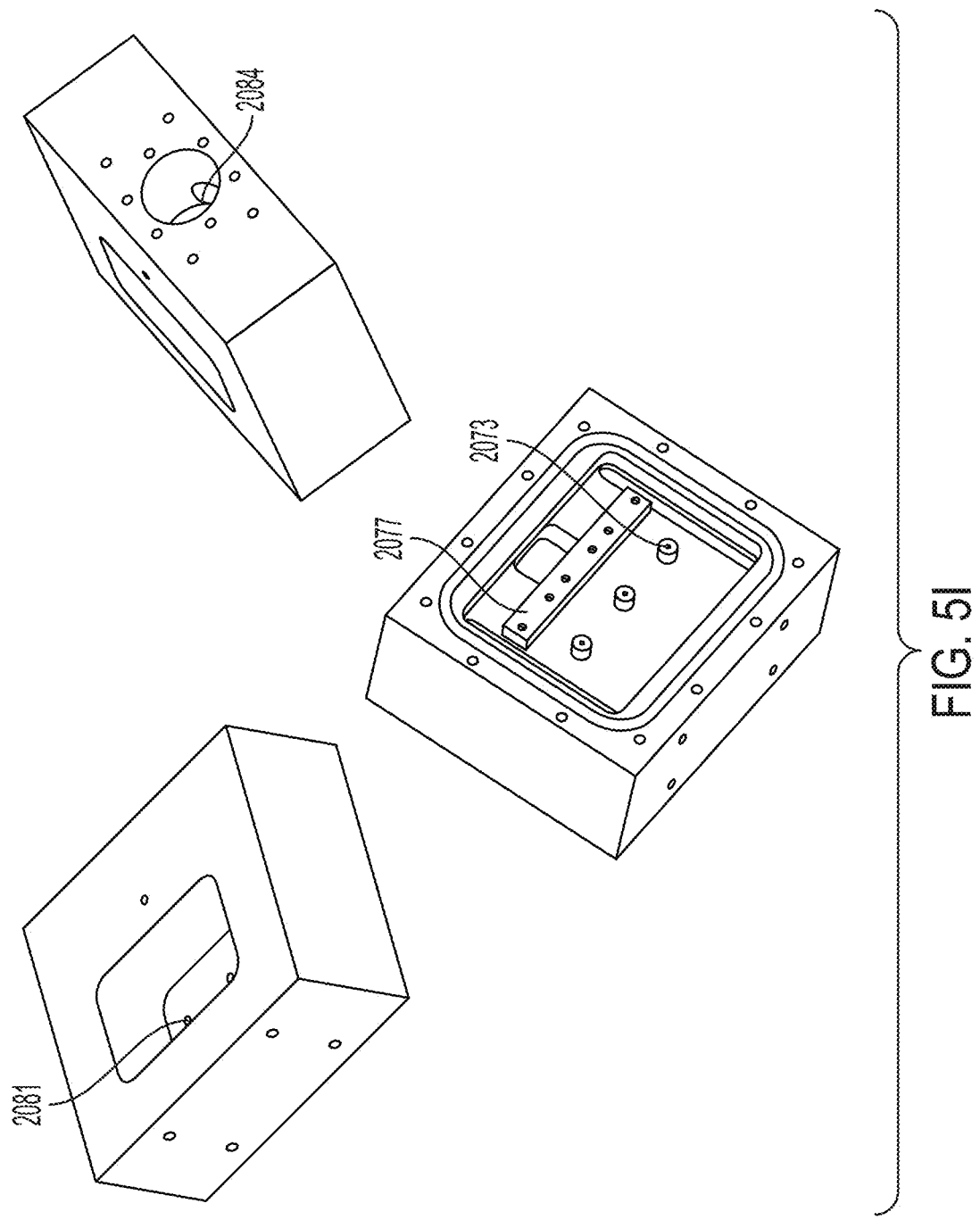

Referring now to FIGS. 5H and 5I, an implementation of the bioreactor base includes features described presently. Bioreactor base 2007 includes cell seeding output (to the interior of the bioreactor) ports 2073 (FIG. 5H) and cell seeding input (from an external (to the bioreactor) cell supply) ports 2081 (FIG. 5I) that are used to seed the lower side of the scaffold. In an aspect, there are as many cell seeding ports 2073 as there are cartridges 2031, but that correspondence is not required. More or fewer cell seeding ports can be configured into bioreactor base 2007 and lid 2005. Push/pull mechanism 2033 can rest upon bioreactor base 2007 at bar 2077, and can operably couple with magnet mount 2055 (FIG. 5D) which rests in cavity 2084 (FIG. 5I) as described herein. Bioreactor base 2007 can include well 2083 into which media is routed from luer lock 2010 (FIG. 5C). In some configurations, rotation enables seeding from the "top", the side facing away from the gravitational pull of the earth, thus using gravity as an aid to seeding the scaffold. The ports on the opposing side of the cartridge 2009 (Fig. C) are seeded after rotating the bioreactor so those ports are on top. In some configurations, one side is seeded, then, after a pre-selected period of time, the bioreactor is flipped so the unseeded side of the cartridge is facing up, and the scaffold is seeded. In some configurations, the scaffold is framed by silicone or another flexible material using a mold. The framing results in silicone walls around the perimeter of the scaffold, and these walls retain the seeded cells on top of the scaffold after the seeded cells is deposited. After the cells are exercised and the process is complete, the silicone walls can be cut away.

Figure 8A:
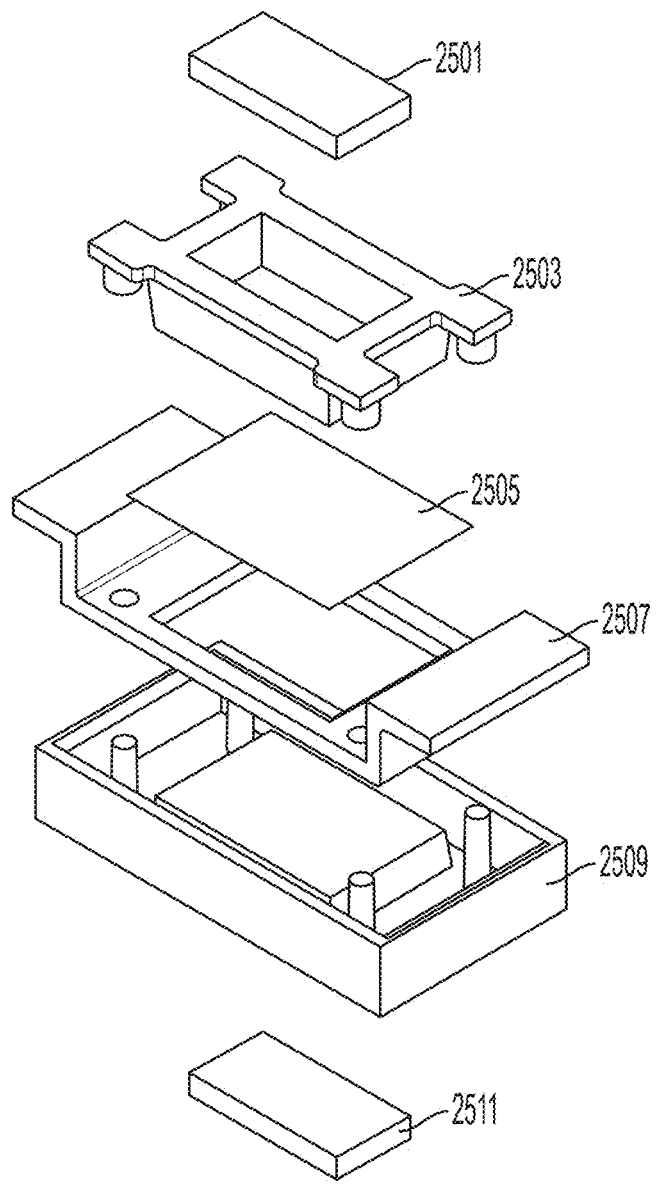
Figure 8B:
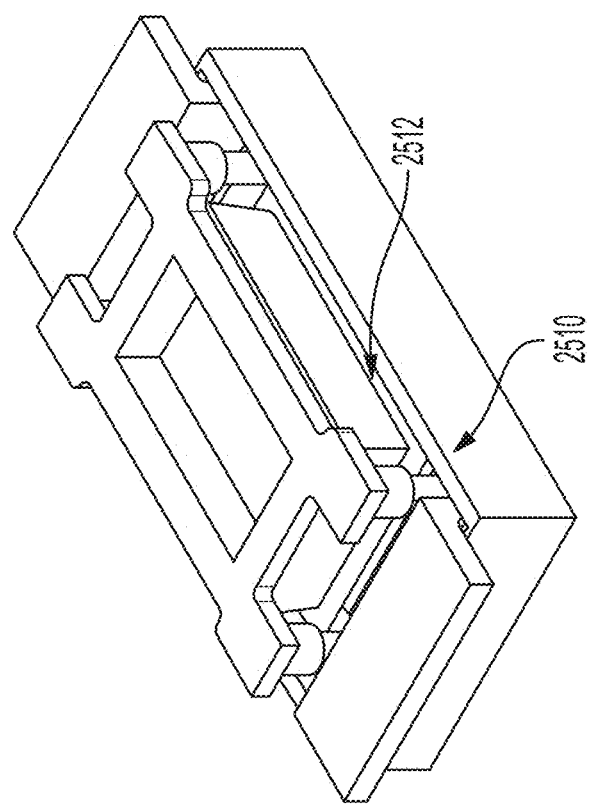

Referring now to FIGS. 8A-8D, a fixture is shown for generating a second configuration of a cartridge. Upper magnet 2501, used with lower magnet 2511, creates compression on decellularized bovine collagen-based matrix (BAM) 2505 (FIG. 8A) to inhibit silicone from invading the surface of BAM 2505 (FIG. 8A) when it is added to the mold. While magnets are shown to create compression of the molding forms on the BAM, any known technique for generating compression as between the molding forms bay be employed and fall within the scope of this disclosure. Scaffold pinch 2503 includes an upper component that is in contact with BAM 2505 (FIG. 8A) that inhibits silicone from invading the surface of BAM 2505 (FIG. 8A). Tray 2507 is used for removing the framed BAM cartridge framed in silicone from the mold after the silicone is fully cured. silicone mold 2509 is where the silicone is poured and creates the shape of the framed BAM cartridge. silicone mold 2509 includes table top 2512 (FIG. 8A) which is the lower surface of SILICONE mold 2509 that is in contact with the lower side of BAM 2505 (FIG. 8A) to inhibit the SILICONE from invading the lower surface. Outer edge 2510 (FIG. 8B) is a clarification of the lines in the drawing between tray 2507 and SILICONE mold 2509.

Figure 6A:
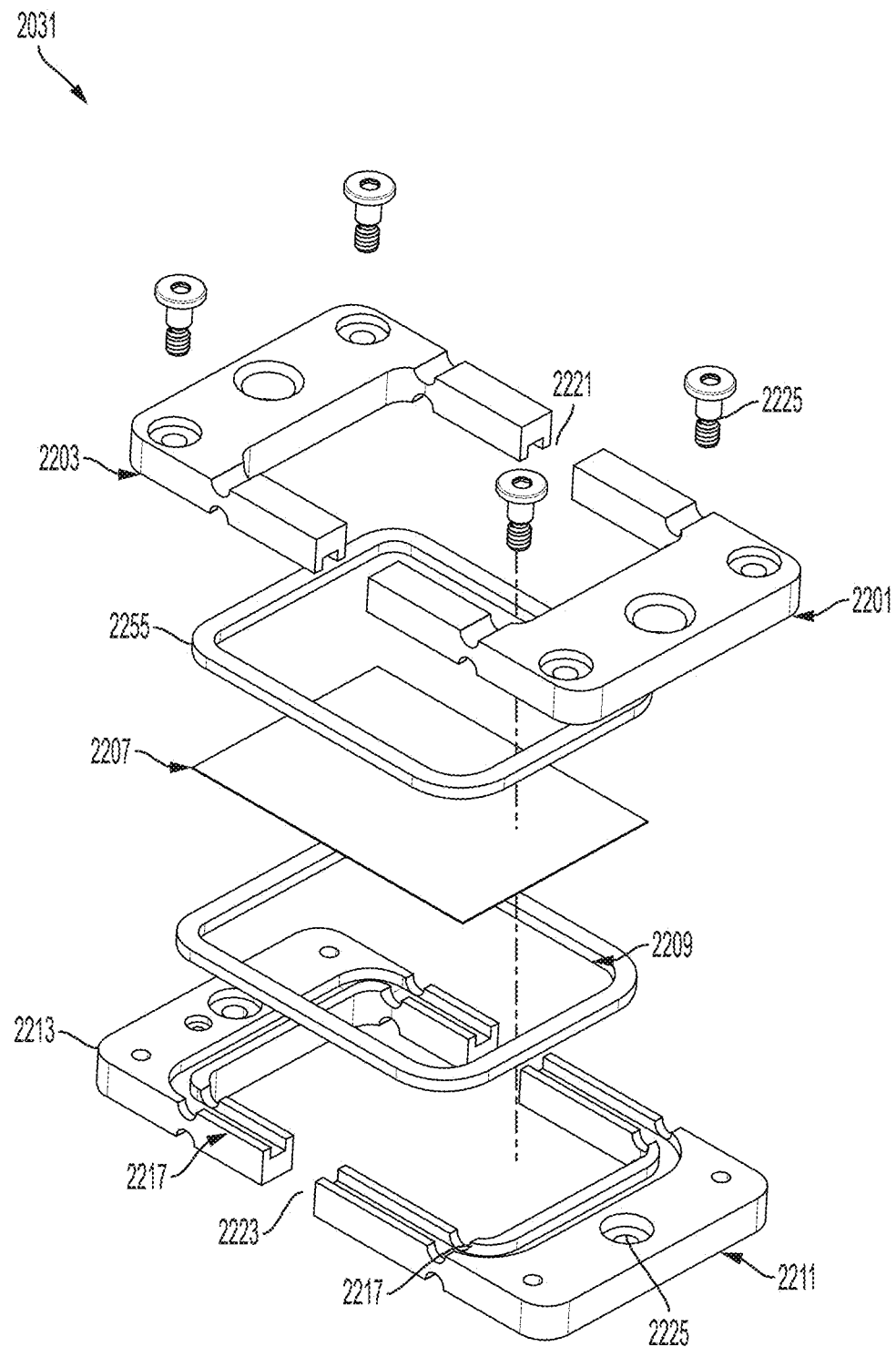
FIG. 6A is an exploded schematic perspective diagram of the cartridge of the implementations of FIG. 7A.

Returning to FIG. 6A, an exploded view of an exemplary scaffold frame, cartridge 2031, is shown. Cartridge 2031 is an example of a frame that enables the mechanical exercise of scaffold 2207. In some configurations, cartridge 2031 is configured to grip scaffold 2207, the edges of which are captured between frame parts 2201/2211 and 2203/2213. In such a configuration, the scaffold is not framed by SILICONE. Instead, the scaffold frame and o-rings 2255/2209 seal the perimeter of the scaffold. In some configurations, frame parts 2201 and 2211 are operably coupled by fasteners 2225. Likewise, frame parts 2203 and 2213 are also operably coupled. In some configurations, frame parts 2201/2211 and frame parts 2203/2213 separate 2221/2223 at seams 2222/2224 (FIG. 6B) when cartridge 2031 is expanded, as described herein. Simultaneously, scaffold 2207 which is gripped between frame parts, is expanded. When seam 2221/2223 is closed, o-rings 2255/2209 and the frames create walls around the scaffold, resulting in a well into which the seeding media can be injected and the cells are forced to settle on the scaffold contained in the desired scaffold seeding area. After the cells adhere to the scaffold, exercise starts and the cartridge is fully surrounded by media. Since the cells are now fixed to the scaffold, opening the seams of the cartridge does not provide an opening for the cells to flow away from the scaffold.

Figure 6B:
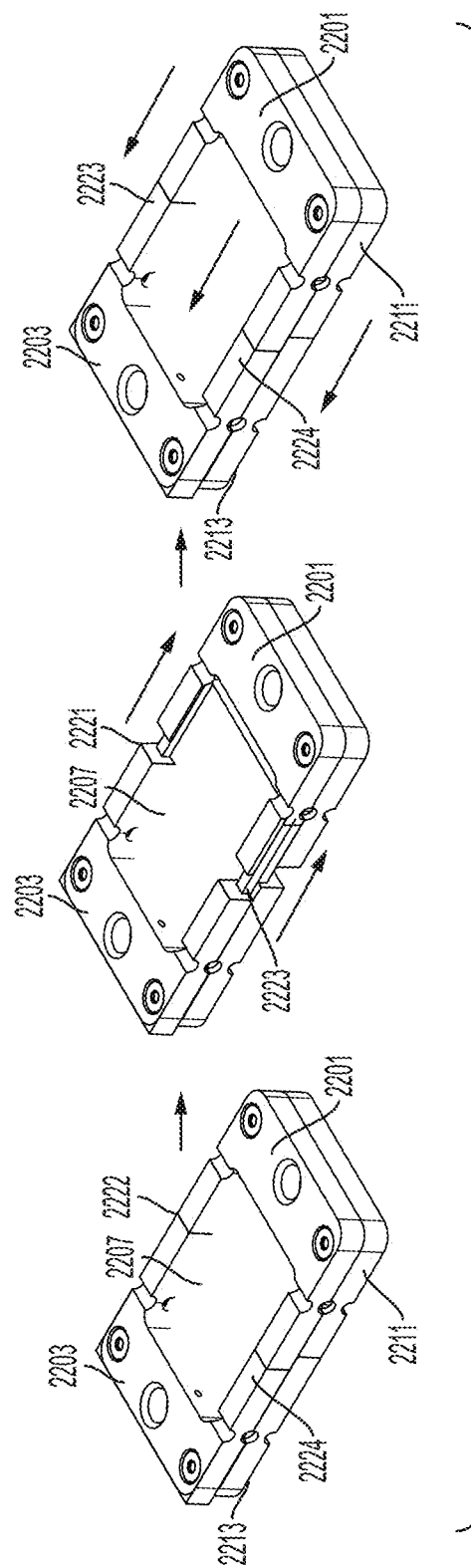
FIG. 6B illustrates schematic perspective diagrams of the cartridge in contracted and expanded form of the implementations of FIG. 7A.

Referring to FIG. 6B, exercise of scaffold 2207 can include movement in at least two directions, thus, the expansion is followed by a contraction in which frame parts 2201/2211 and 2203/2213 return to a resting position in which the space at seams 2221/2223 is closed. Cartridge 2031 and scaffold 2207 can undergo further expansions and contractions when required for tissue maturation. The present teachings contemplate various shapes and sizes of scaffolds and their associated cartridges. In an aspect, a scaffold can take virtually any two-dimensional geometric shape for which a complementary cartridge can be constructed. For example, a circular scaffold can be surrounded by a circular cartridge that can be stretched in various directions, not limited to two directions, depending upon the location(s) of seams between the sections of the cartridge. An alternate configuration in which silicone walls molded to the perimeter of the scaffold would also enable stretching in various directions. In an aspect, three-dimensional geometric shapes can be accommodated. The bioreactor can take a general shape that accommodates both two- and three-dimensional scaffolds, or can take a specific shape depending upon the shape of the scaffold.

Referring again to FIG. 6A, in an aspect, cartridge 2031 includes flexible material coupling frame part 2201 with frame part 2203, and frame part 2211 with frame part 2213. In an aspect, flexible ring 2255 can rest in a first channel (not shown), and flexible ring 2209 can rest in channel 2217. When the frame parts are clamped together, the flexible rings, pressed between the frame clamps, can stretch when the frame parts expand, and can at the same time couple the frame parts so that they return to their original configuration when the expansion is complete. The flexible rings, which can provide sealing as well as stretching, can be constructed of material chosen based on operating temperature, operating pressure, finish, and stretch. Such materials can include, but are not limited to including, nitrile, fluoroelastomer, silicone, highly saturated nitrile, and PTFE, among others. The effect of friction due to intermittent movement (breakout friction) and continuous movement (running friction) can cause high pressures and heat, respectively, to build up. For optimum performance, in addition to movement type, the size, squeeze, stretch, chemical compatibility, temperature, pressure, and friction of the application are considered in material selection for the flexible rings. The system of the present teachings can accommodate various designs, materials, and construction of the cartridge and flexible ring combination.

Figure 7A:
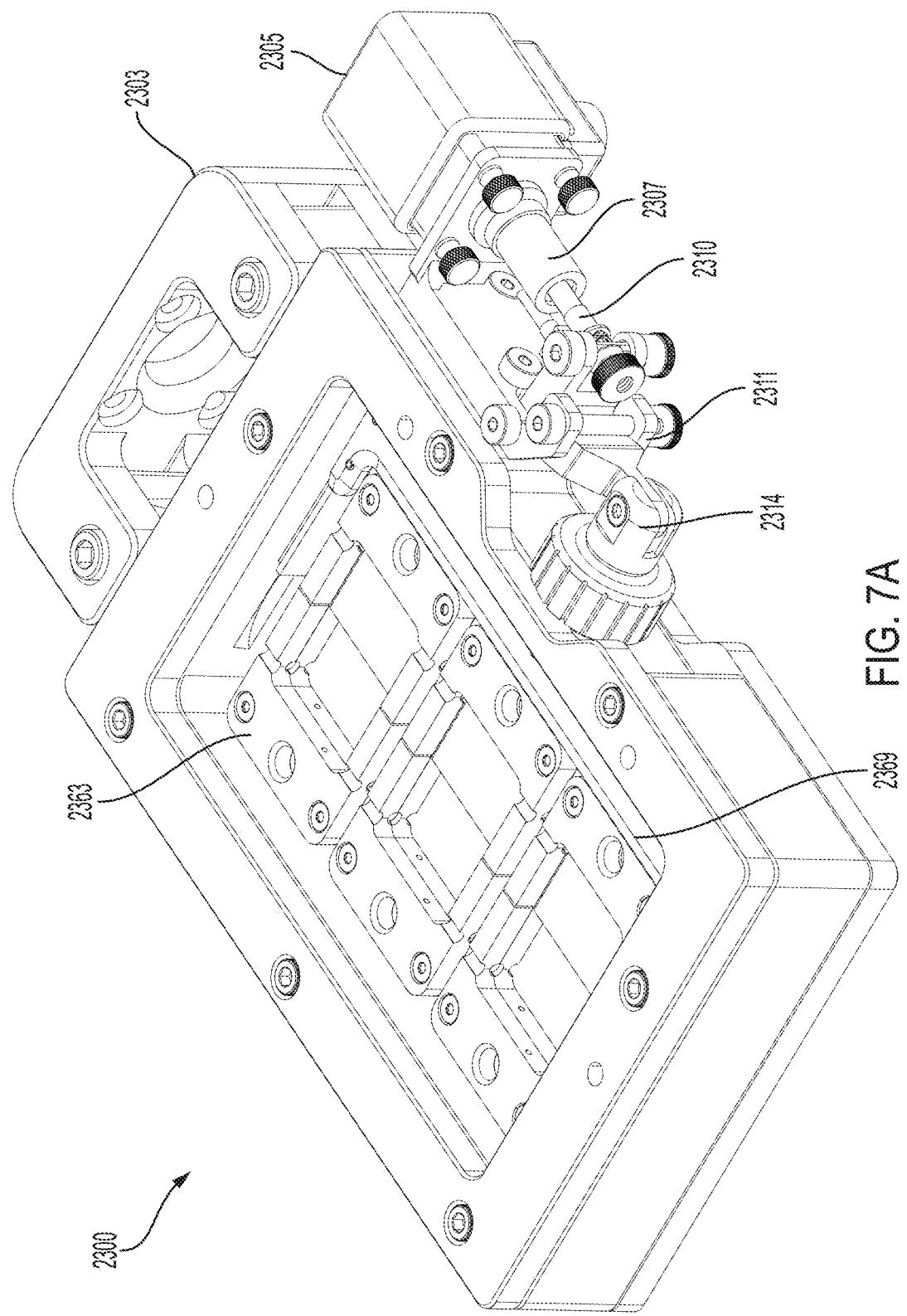
FIG. 7A is a schematic perspective diagram of another implementation of the system of the present teachings.

Referring now to FIG. 7A, a second implementation of the system of the present teachings is shown. The second implementation includes a motor subsystem that drives the motion of cartridges inside a bioreactor, and a mechanism for rotating the bioreactor. In the second implementation, the motor subsystem can be decoupled from the bioreactor, and cell seeding is accomplished through seed ports integrated with the cartridges. An example of the second implementation is system 2300 which includes, but is not limited to including, a rotary yoke 2303 to rotate the bioreactor, and a detachable motor subsystem. The motor subsystem can drive the movement of cartridges 2363 enclosed in the bioreactor subsystem. As in the first implementation described herein, cartridge 2363 includes frame parts connected by a flexible ring. The frame parts hold the scaffold between them, and split to enable exercise of the scaffold. As in the first implementation, the motor subsystem includes a magnetic coupling to enable movement of the frame and the scaffold.

Figure 7B:
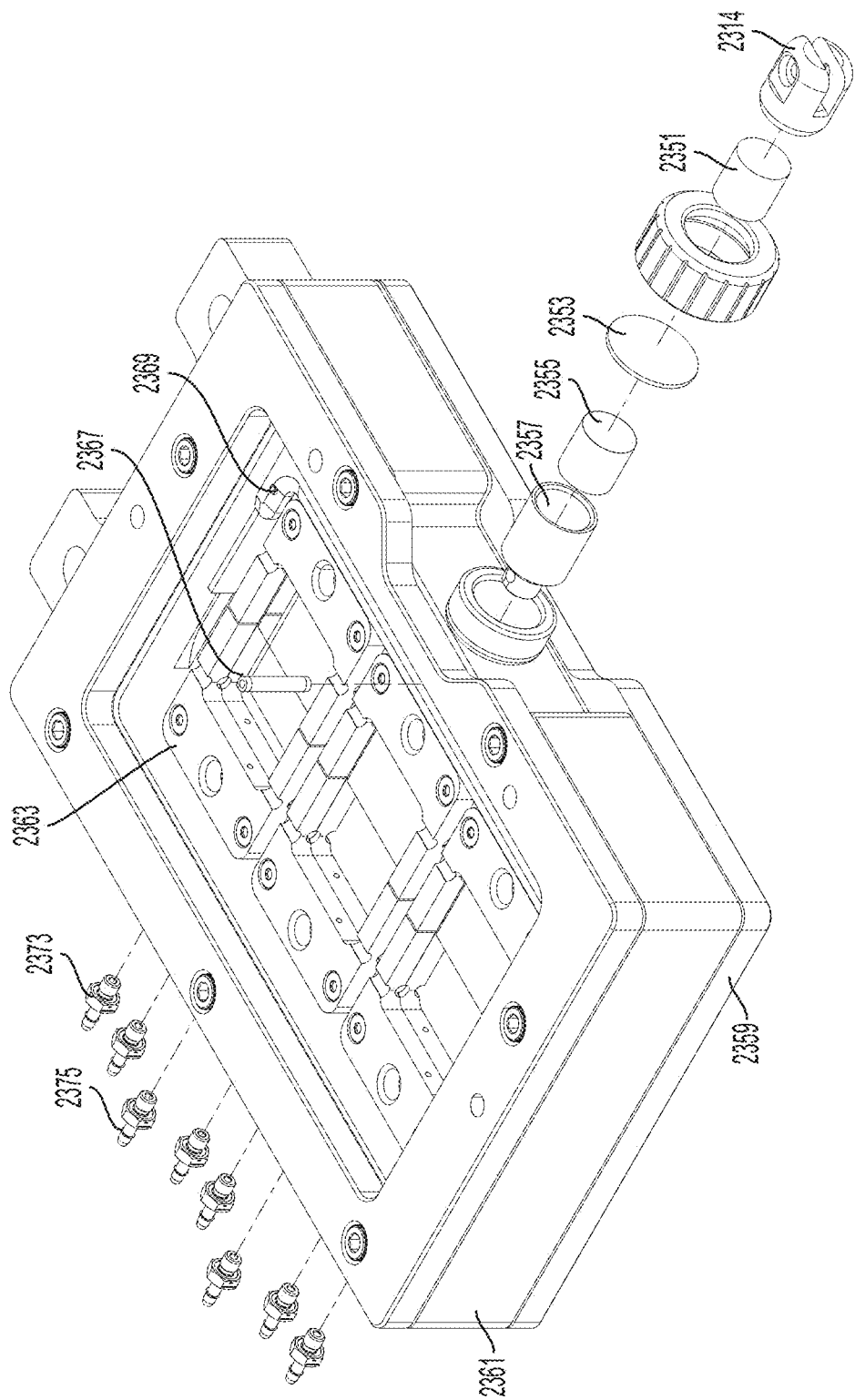
FIG. 7B is a partially exploded schematic perspective diagram of the bioreactor subsystem and motor linkage of the implementation of FIG. 7A.
Figure 7C:
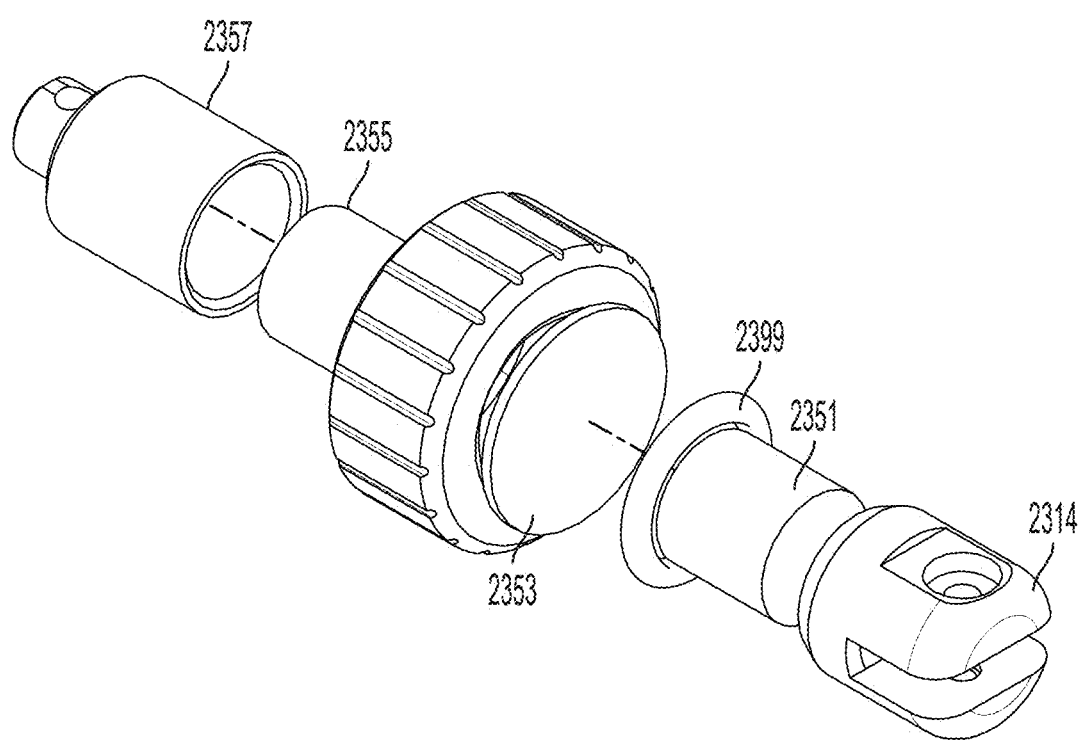
FIG. 7C is an exploded view of the motor linkage of FIG. 7B.

Referring now to FIGS. 7B and 7C, magnet tube 2357 encloses first magnet 2355. Cooperating magnet 2351 is positioned across diaphragm 2353 from first magnet 2355, and o-ring 2399 (FIG. 7C) and diaphragm 2353 can seal the bioreactor from environmental contaminants. O-ring 2399 (FIG. 7B) can prevent gas and fluid leaks, and can be constructed of materials that meet the demands of the environment. For example, leak protection can be provided by a material such as polytetrafluroethylene, nitrile, neoprene, ethylene propylene diene monomer rubber, and fluorocarbon. If strong chemical resistance is needed, o-ring 2399 can be constructed of, for example, a co-polymer of ethylene, tetrafluoroethylene, and perfluoromethylvinyl ether. Cells can be provided directly to the scaffolds in cartridges 2363 through fluid connector 2373 (FIG. 7B), the cells entering the cartridge well through fluid connector 2373. One seeding fluid connector 2373 can seed a first surface of the scaffold, while the other seeding fluid connector 2373 can seed a second surface of the scaffold, since the scaffold is located between the two ports that connect to the fluid connectors (FIG. 7M). Fluid connectors 2375 can simultaneously admit media and nutrients to the bioreactor chamber and vent the chamber to remove air from the chamber.

Figure 7D:
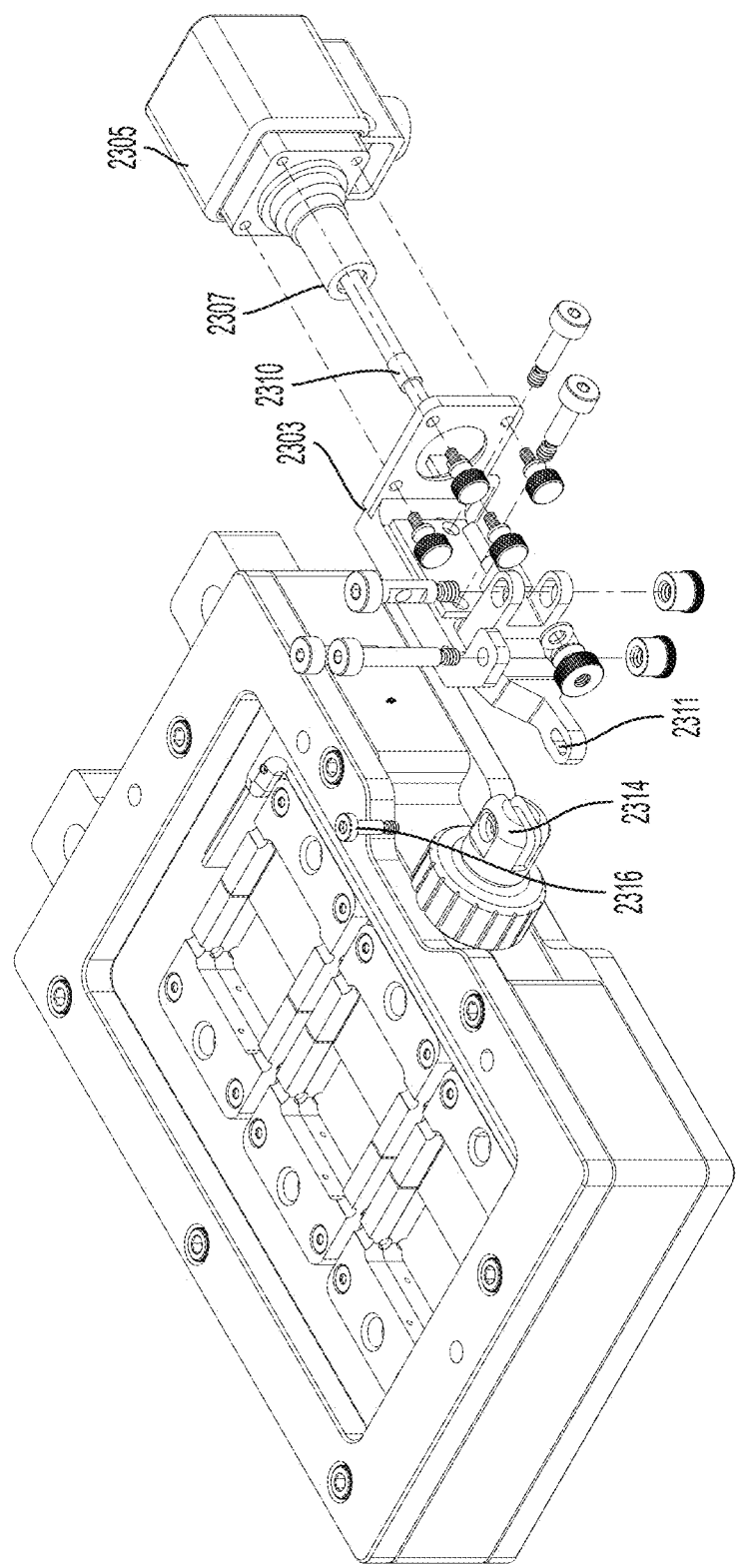
FIG. 7D is a partially exploded schematic perspective diagram of the bioreactor subsystem, the motor linkage, and the motor subsystem of the implementation of FIG. 7A.

Referring now to FIG. 7D, magnet cup 2314 is coupled to the motor subsystem by connector 2316 which connects magnet cup 2314 with linkage 2311 in a prismatic-like joint. By removing connector 2316, the motor subsystem can be decoupled from the bioreactor subsystem. The position of pull mechanism 2369 (FIG. 7A) is retained as described herein, and the bioreactor subsystem can be transported to where the tissue exercised on cartridges 2363 (FIG. 7A) is needed. Likewise, the tissue can be further exercised by reconnecting the motor subsystem with the bioreactor subsystem. Other forms of connection between the bioreactor subsystem and the motor subsystem are contemplated by the present teachings. For example, linkage 2311 and magnet cup 2314 can be constructed as a click-to-connect coupling. Additionally, connector 2316 can include a pin or a screw. Magnet cup 2314 and linkage 2311 can be the two parts of a ball joint or a knuckle joint.

Figure 7E:
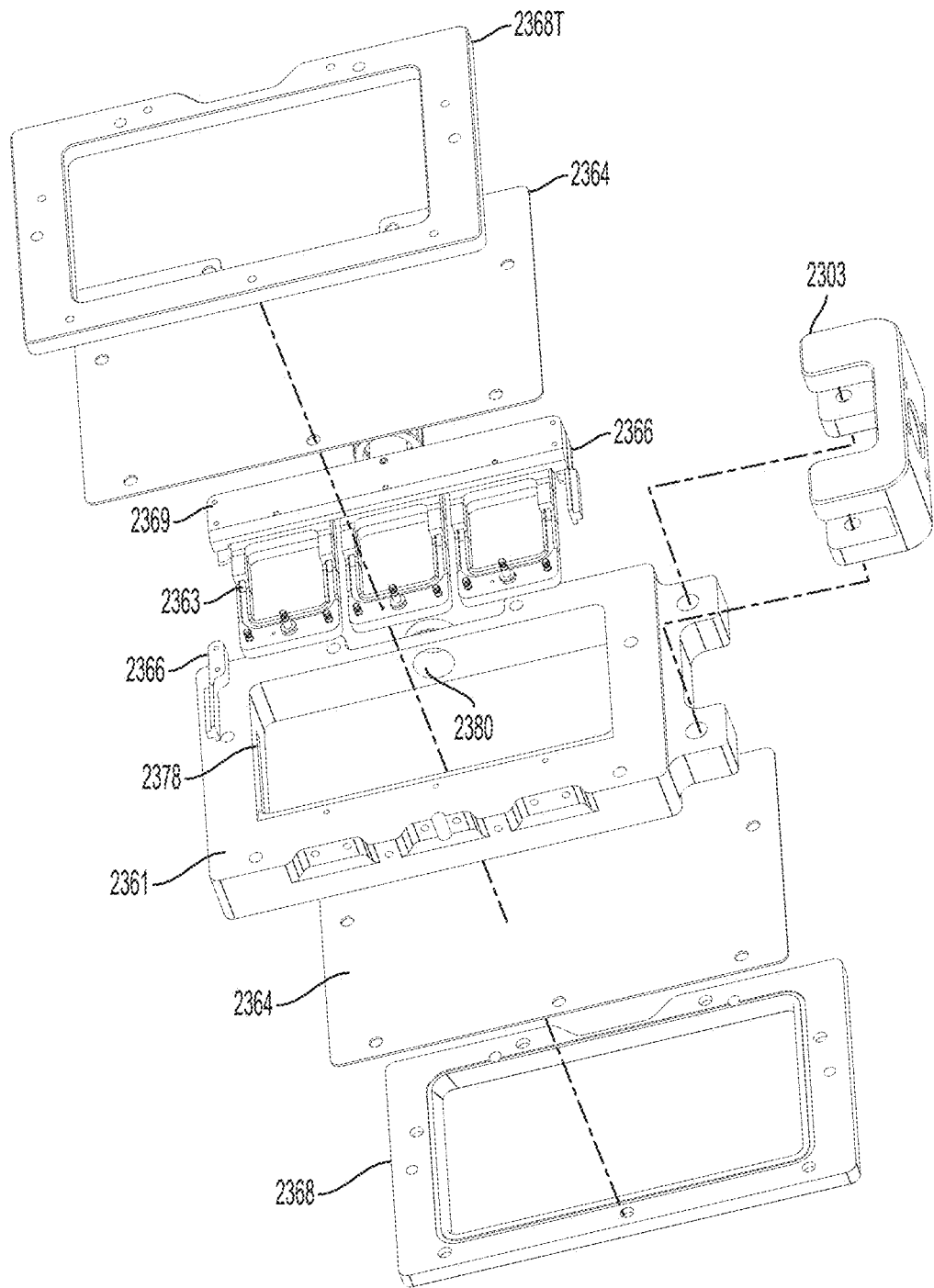
FIG. 7E is an exploded schematic perspective diagram of the bioreactor subsystem of the implementation of FIG. 7A.

Referring now to FIG. 7E, the parts of the bioreactor subsystem are shown. The various parts of the bioreactor subsystem are held together by frame clamps 2368T and 2368. Resting on one side of each frame clamp are films 2364 which surround and protect cartridges 2363 and the scaffolds they exercise. In some configurations, films 2364 are gas permeable, making it unnecessary to provide a sterile filter to add gas to the environment of cartridges 2363. Cartridges 2363 are mounted to pull mechanism 2369. Coupled with pull mechanism 2369 are rails 2366 which slide into the guiderail mount within guiderail 2378, which is cut into base 2361. When pull mechanism 2369 is forced forward or backward by motor subsystem, which is coupled with pull mechanism 2369 through cavity 2380 in base 2361, rails 2366 slide back and forth within guiderail 2378, thus moving cartridges 2363 and exercising the scaffolds held within cartridges 2363.

Referring now to FIGS. 7F and 7G, to exercise the scaffold, motor linkage 2405 is activated to move pull mechanism 2403 from its resting position shown in FIG. 7F to its extended position shown in FIG. 7G by sliding rails within guardrail 2378 (FIG. 7E). Cartridge seam 2409 forms gap 2411 when pull mechanism 2403 is moved to its extended position, pulling first cartridge part 2407 away from second cartridge part 2415 and exercising the scaffold held within the cartridge. Cartridge part 2415 is fixed to base 2413, whereas cartridge part 2407 is free to slide in guardrail 2378.

Figure 7H:
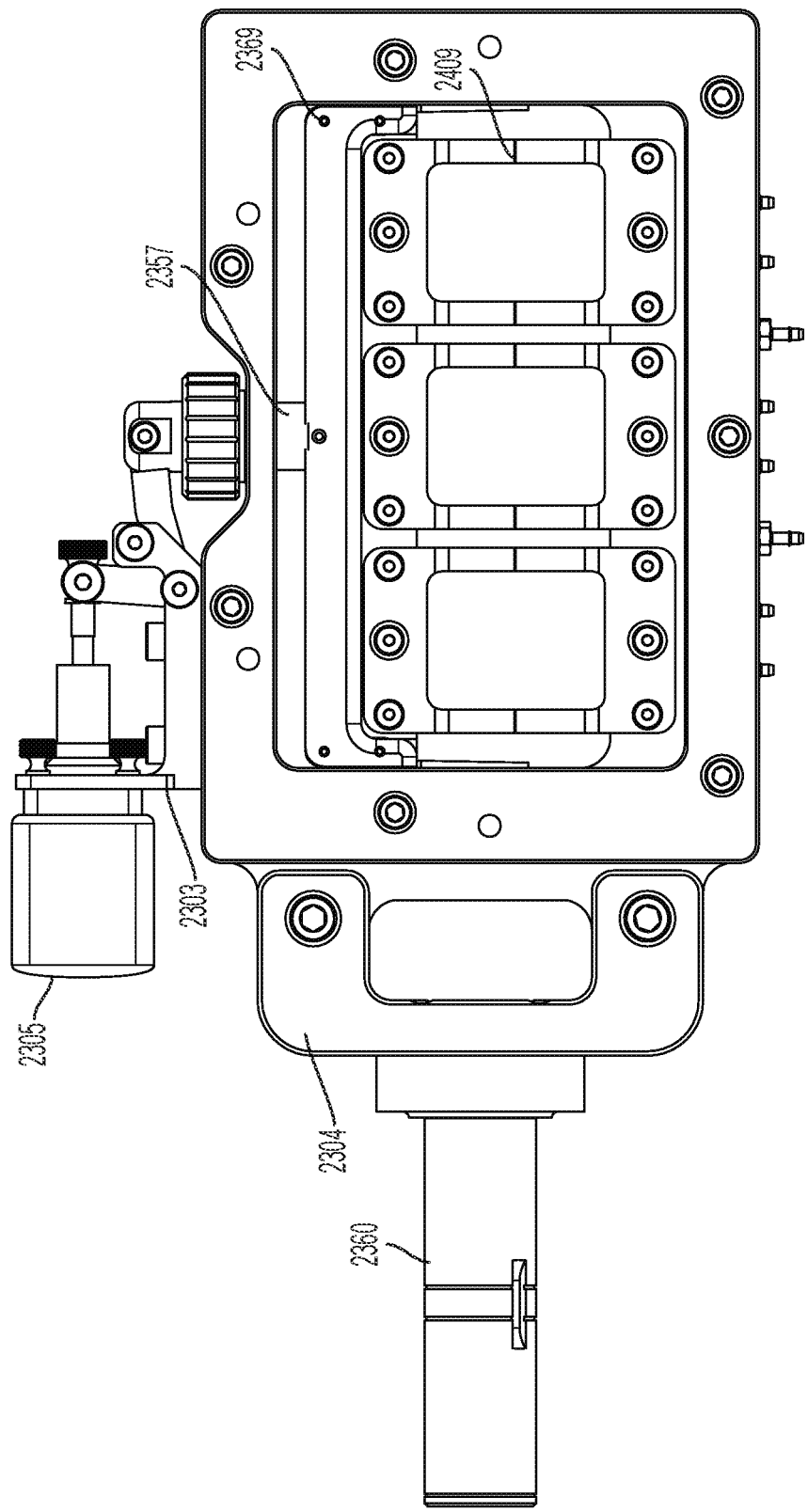
FIG. 7H is a top plan diagrams of the of the implementation of FIG. 7A.
Figure 7I:
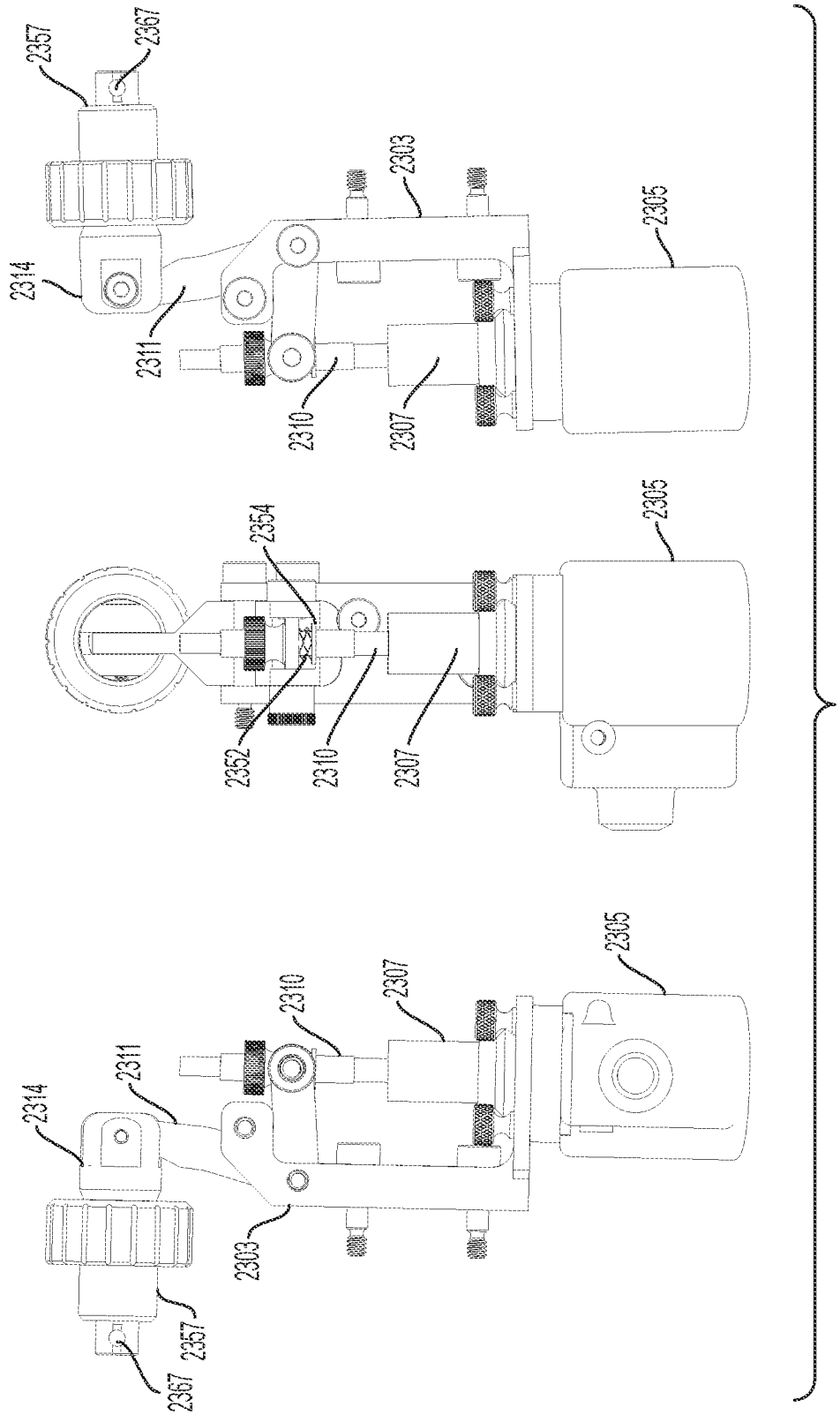
FIG. 7I illustrates views of the motor subsystem from different perspectives of the implementation of FIG. 7A.

Referring now to FIGS. 7H-7L, an implementation of the movement means of the present teachings is described. Protruding from the side of the bioreactor system is a first part of the movement means. The first part interfaces directly with pull mechanism 2369 (FIG. 7H) at the bioreactor end, and with the motor subsystem at the opposing end. The interface with pull mechanism 2369 (FIG. 7H) includes magnet tube 2357 held in place with slotted spring pin 2367 (FIG. 7I). The present teachings contemplate other connection means. Magnet 2355 and 2351 (FIGS. 7J, 7K and 7L), when coupled, supply pressure to pull mechanism 2369 (FIG. 7H) to pull the cartridges apart at their seams 2409 (FIG. 7H) and exercise the scaffolds. The motor motion couples directly to magnet 2351, causing magnet 2351 to move. Magnet 2351 is directly coupled to pull mechanism 2369 by way of magnet 2355. The magnetic force between magnets 2351 and 2355 results in a movement of magnet 2355 when magnet 2351 moves. Magnet cup 2314 houses magnet 2351 and provides half of the linkage between the bioreactor interface parts and the motor subsystem. Magnet cup 2314 and linkage structure 2311 form a rotatable connection at tongue 2492 that slides into a gap in magnet cup 2314. The geometry of the gap enables linkage structure 2311 to rotate to move the motor subsystem to the side of the bioreactor. When the motor structure is needed to exercise the scaffold, it can be rotated to face the bioreactor so that the linear actuator can exert pressure on the interface structure and therefore on pull mechanism 2369 (FIGS. 7H 7G). The motor pressure moves the cartridges into a contracted position to complete the exercise cycle begun by the magnetic force.

Continuing to refer to FIGS. 7H-7L, linear actuator 2307 supplies pressure through plunger 2310. Plunger 2310 relies on washer 2354/stacked wave disc spring 2352, mounted onto linkage 2311 through shoulder screw 2398, to provide the pressure onto pull mechanism 2369 (FIG. 7H), buffered by spring 2352. Shaft mount 2303 securely couples linear actuator 2307 with linkage 2311. Position sensor mounting brick 2499 provides a mounting option for a position sensor to track the location of plunger 2310, the data from which can be used to control the scaffold exercise regime. Power and environmental protection for linear actuator 2307 can be provided by junction box 2305, capped by junction box cap 2395.

The rotary shaft mount 2304 (FIG. 7H) provides a means for rotary activation means 2360 to fully rotate the bioreactor in order to seed cells on both sides of the scaffold.

Figures 7K, 7L:
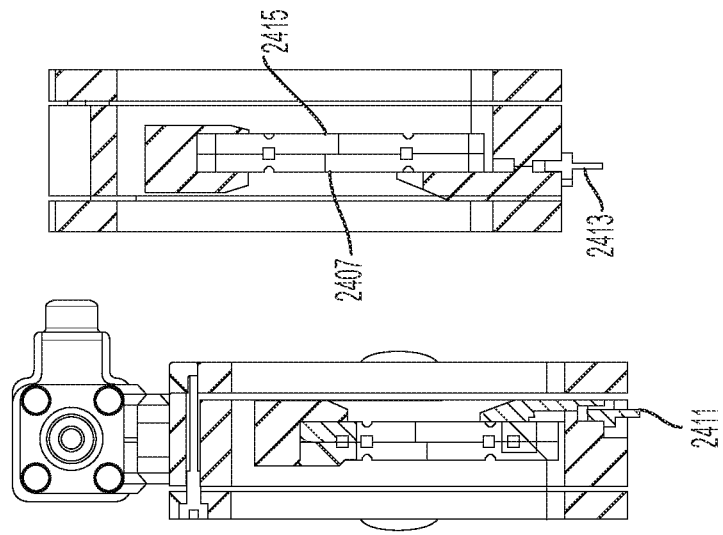
FIGS. 7J, 7K and 7L illustrate top plan and cross sectional views of the implementation of FIG. 7A.
Figure 7J:
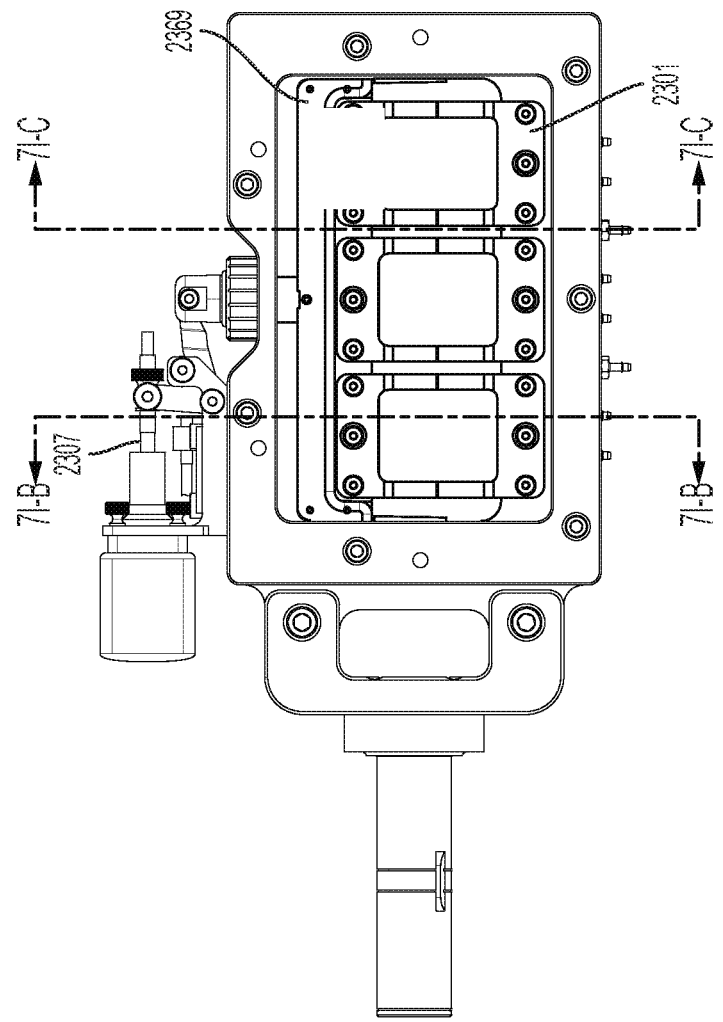
Figure 7M:
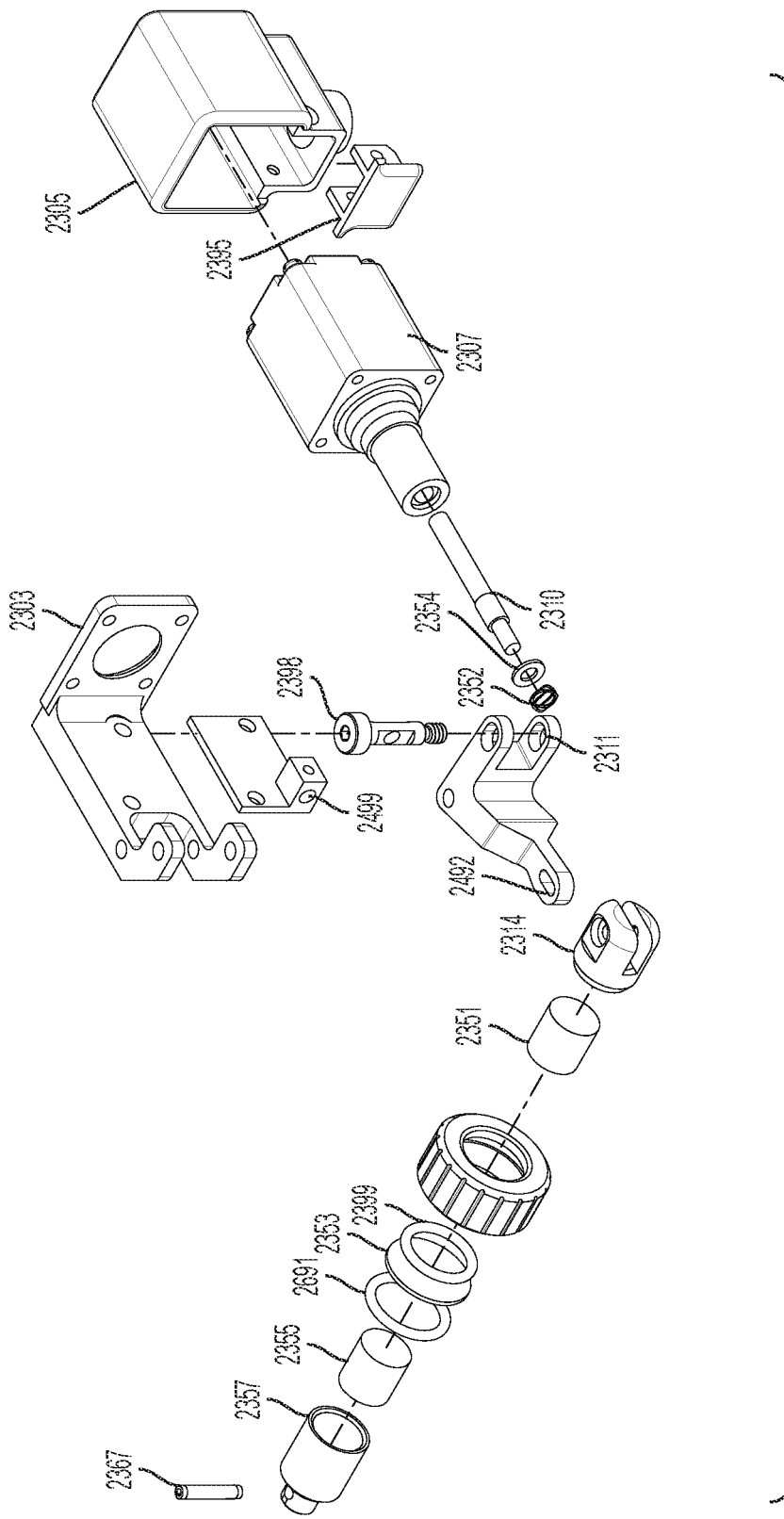
FIG. 7M is an exploded schematic perspective diagram of the linkage and motor subsystems of the implementation of FIG. 7A.

Referring specifically to FIGS. 7J, 7K, and, 7L, cell seeding port 2413 interfaces directly with cartridge 2301. Media to fill the bioreactor cavity is provided through media port 2411. Cells are seeded onto one side of the scaffold, and allowed to settle onto the scaffold and attach. The rotary actuator flips the bioreactor, so the opposite side of the scaffold can be seeded with cells, which are allowed to settle and attach. The exercise/stretch routine starts after both sides are seeded and the cells have attached.

Figure 7N:
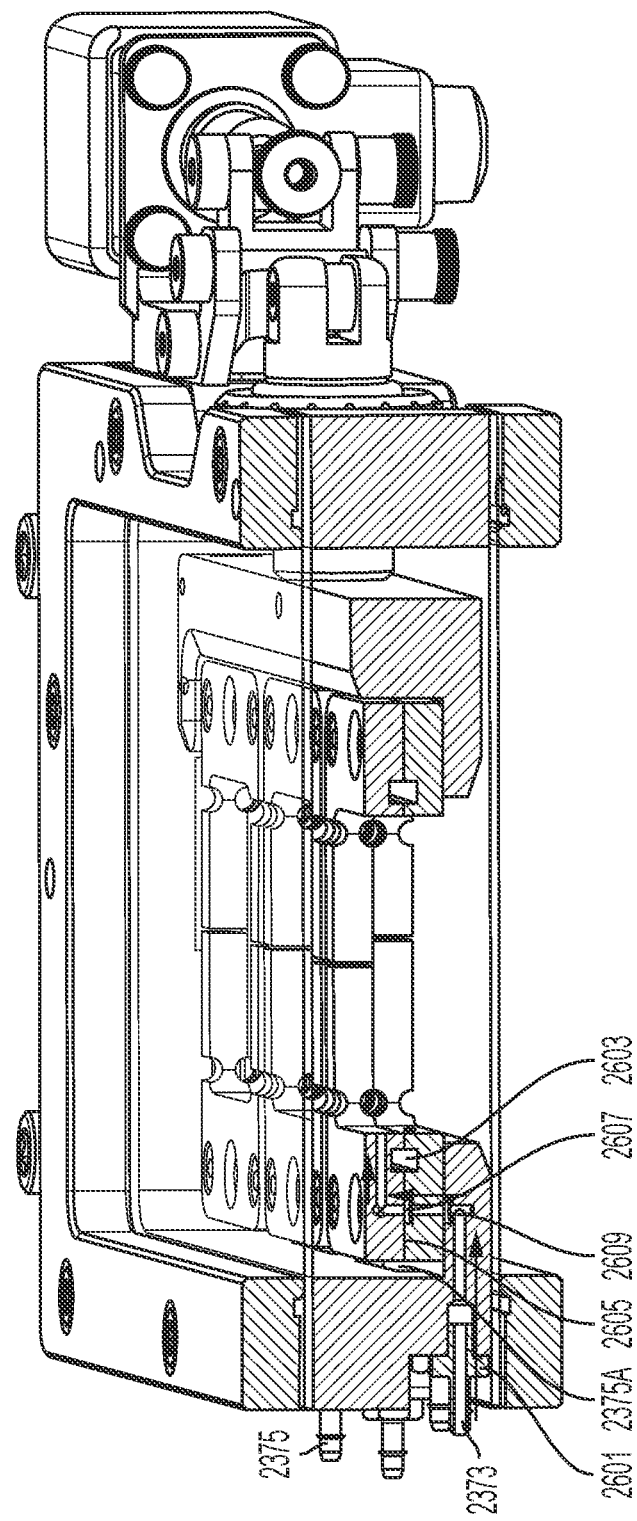
Figure 70:
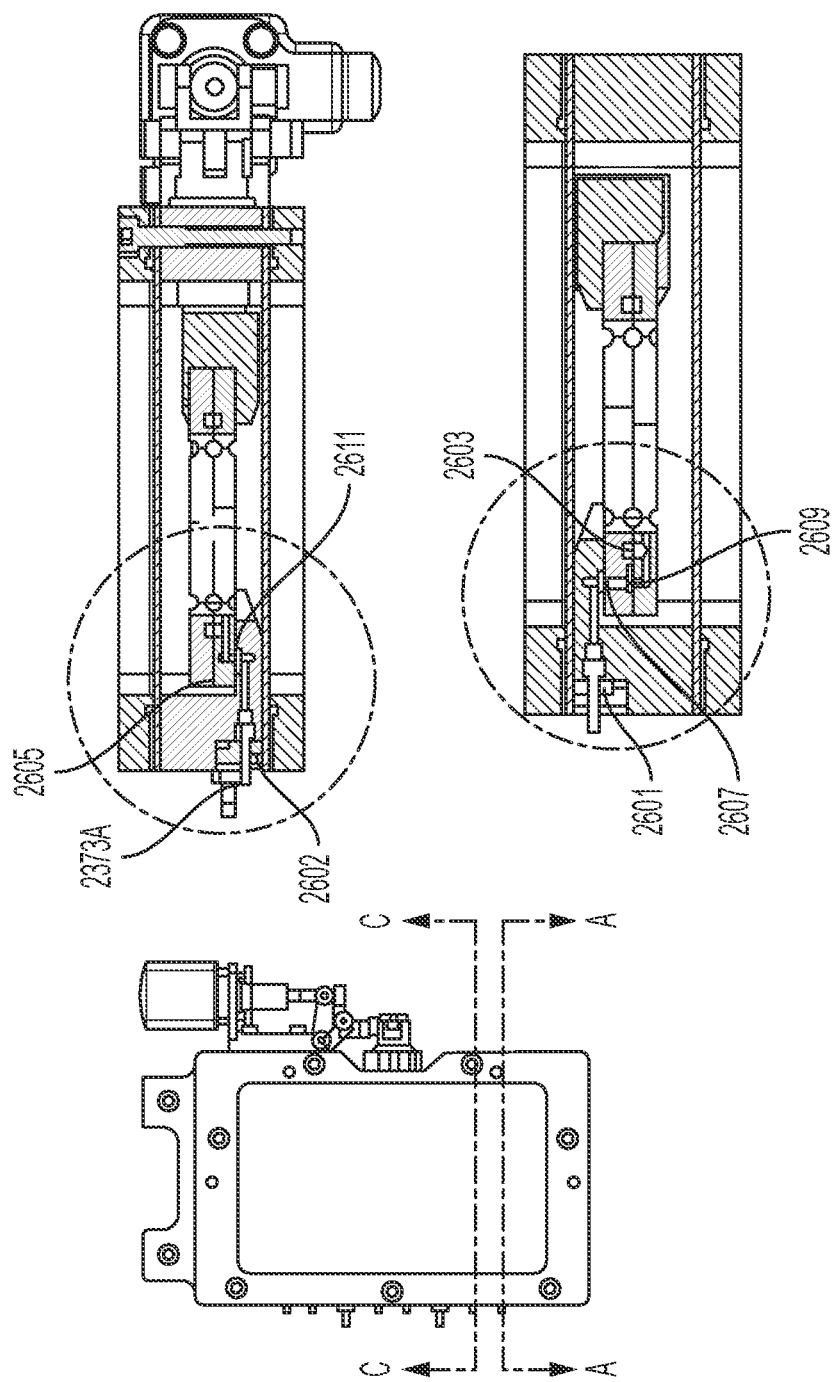
Figure 7P:
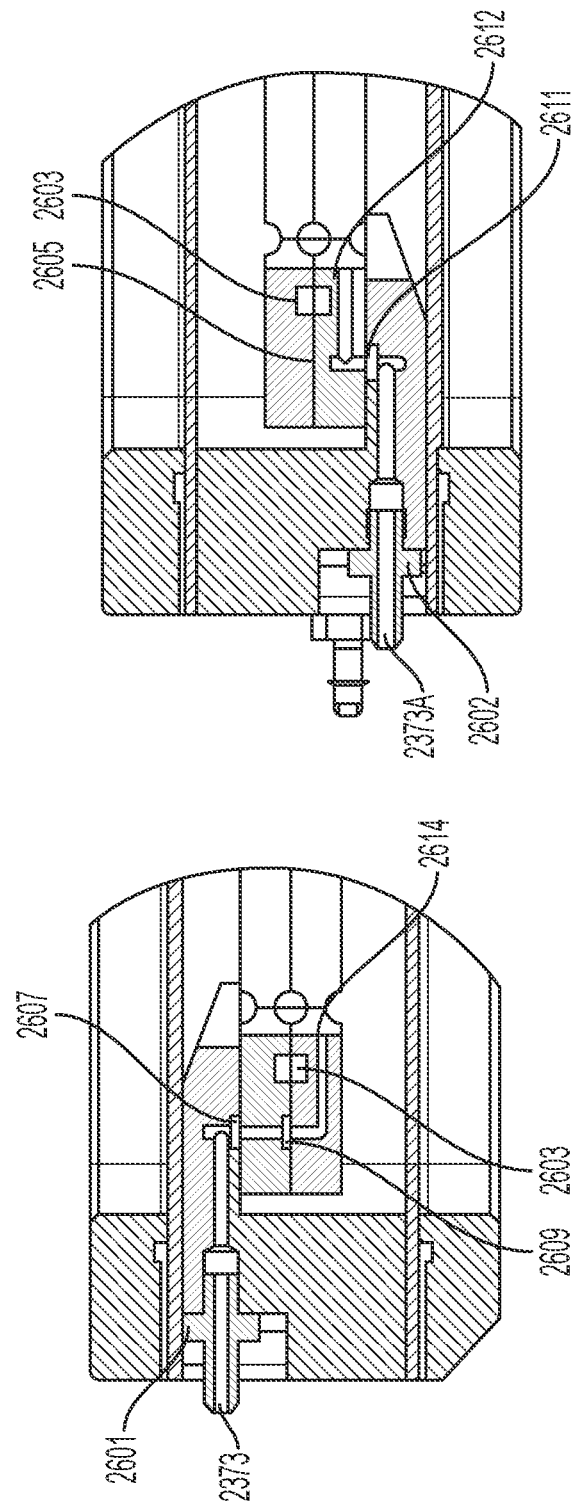

Referring now to FIGS. 7M-7O, the components of the configuration that enable multi-surface cell seeding are shown. Specifically, referring to FIG. 7M, seeding of a first surface begins at fluid inlet 2373. The bioreactor interior is sealed from the environment beginning at seal 2601. The direction of travel of the cells introduced through inlet 2373 is shown by the arrows beginning at inlet 2373. As shown, the cells are directed to exit out ports 2612 and 2614 (FIG. 7O) and deposit above where the scaffold would be (scaffold not depicted in 7M). Seals 2609 and 2607 also provide barriers from environmental contamination that could be introduced by inlet 2373. Also shown are media/vent inlet/outlet 2375. The media and/or nutrients that are introduced into the well of the bioreactor enter the bioreactor through cavity 2375 and exit into the internal region 2375A surrounding the bioreactors (FIG. 7M). The seeded cells are trapped on scaffold 2605 by a flexible ring described elsewhere herein that rests in cavity 2603. Detail B (FIG. 7O) of section A-A (FIG. 7N) are cross-sections that show the details of FIG. 7M. Seeding a second side of scaffold 2605 is shown in detail D (FIG. 7O) of section C-C (FIG. 7N). Cells entering inlet 2373A travel on the path shown by the arrows in section C-C, and seals 2602 and 2611 prevents environmental contamination from inlet 2373A. The cells in this case do not cross scaffold 2605. Instead the cells are deposited on scaffold 2605 on the same side of scaffold 2605 on which the cells entered, at outlet 2612 (FIG. 7O). Section C-C and detail D show components that would be rotated 180° before the cells are deposited in order to take advantage of gravity to encourage the cells to attach.

In a first test, one of the systems of the present teachings was placed at 37° C., 5% $CO_2$. In this test, C2C12 cells were fluidically seeded within the sealed bioreactor onto both sides of the scaffolds through the designated seeding ports of the sealed bioreactor or, possibly, directly into the cartridge. A first scaffold side was seeded, then a pre-selected amount of time elapsed before the second side was seeded. The bioreactor was fully closed to the environment throughout the seeding process, which allowed the seeding to be per-formed in a non-cleanroom environment, but using an aseptic technique and specific sample ports, with no contamination issue. A pre-selected amount of time again elapsed since the second seeding, and the samples were stained and imaged to assess cell viability and coverage. Samples were stained with NucBlue and Calcein. In this test, cells were present on both sides of each scaffold, indicating successful delivery of the seeding charge through the seeding ports to the cartridge.

In a second test, a cell harvest solution was quenched with an equal volume of proliferation media, and cells were counted, centrifuged, and resuspended at a desired concentration for seeding. An amount of cell solution was added to a sterile syringe to seed each scaffold with a pre-selected number of cells. The syringe was connected to the Side B seeding ports above each cartridge position, and the seeding charge was manually delivered. A syringe filled with sterile air was then attached to each seeding port to chase out the remaining seeding charge volume. Side B was seeded first so that Side A was already in the upward-facing position when exercise is started. After 24 hours, the bioreactor was flipped so Side A was facing upward, ensuring that the headspace air gap and any separate bubbles fully translated from Side B. The cell harvest and seeding procedure was repeated to seed side A.

For exercise tests, the bioreactors were drained 24 hours after the second seeding. The reactors were refilled with differentiation media, and an exercise protocol was initiated.

In all tests where the samples were seeded within the assembled bioreactor, high coverage was observed, suggesting that the print-free seeding mechanism of the bioreactor is effective in delivering and maintaining cells within the seeding window. Based on the results presented here, it appears that scaffold tautness could be important for uniform seeding of the scaffold. The bioreactor configuration used for the tests is easy to assemble, incorporates a leak-proof cartridge and hermetically sealed reservoir, and has a robust exercise mechanism which can apply up to 25% strain. The bioreactor demonstrates an effective method for fully enclosed, hydrogel-free delivery of cells to BAM scaffolds resulting in even cellular distribution and high cell coverage. The reservoir also allows for an ~60% reduction in required media volume compared to other similar bioreactors. The cartridge and bioreactor concepts are amenable to cost-effective production and scale-up.

A method for use of one of the configurations of the system of the present teachings was tested using the following steps: (1) wash all components of the bioreactor with soap and water, rinse with DI and allow to dry; (2) autoclave all components (excluding BAM scaffolds) for 30 minutes at 121° C.; (3) rehydrate sterilized BAM scaffolds by covering in sterile PBS for at least 10 minutes; (4) drape the BAM over the bottom cartridge piece such that the BAM covers all of the O-ring but not the seeding ports, cover with top cartridge and seal top and bottom pieces together; (5) trim excess BAM from the edges of the cartridge and store assembled cartridge in sterile PBS to prevent dehydration during subsequent cartridge assembly; (6) load the cartridges into the bioreactor; (7) flip the bioreactor to apply the bottom-side silicone membrane and stainless steel plate, then flip again to apply the top-side silicone membrane and stainless steel plate; (8) fill the bioreactor with 60 ml of growth media through the fill/drain port system, and remove any air from the bioreactor by tiling the port side up and pulling air from the drain port while the fill port is sealed; (9) rotate the reactor until the top side of the cartridges are up and the reactor is level; (10) seed side A of the BAM, mature for 24 hours, rotate the bioreactor and seed side B, mature for 24 hours; (11) remove growth media; (12) add 100 ml of differentiation media, and rotate the bioreactor 90° with the ports at the top and pull the excess air from the bioreactor, rotate to original orientation; and (13) exercise the tissue for five days. The tests results indicate that the bioreactor is immediately integratable into a manufacturing line. For closed, fluidic seeding, growth, and maturation of TEMR product, the bioreactor performance is superior to existing bioreactors.

Figure 9B:
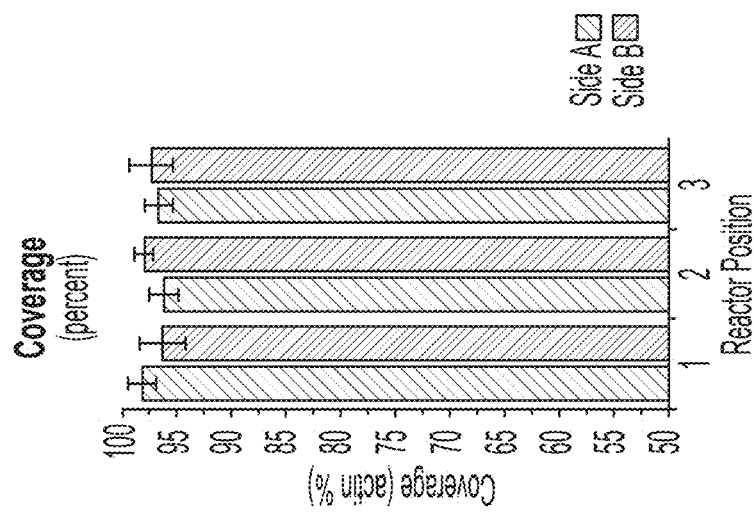
FIGS. 9A-9C are pictorial and graphical illustrations of test results using the system of the present teachings.
Figure 9A:
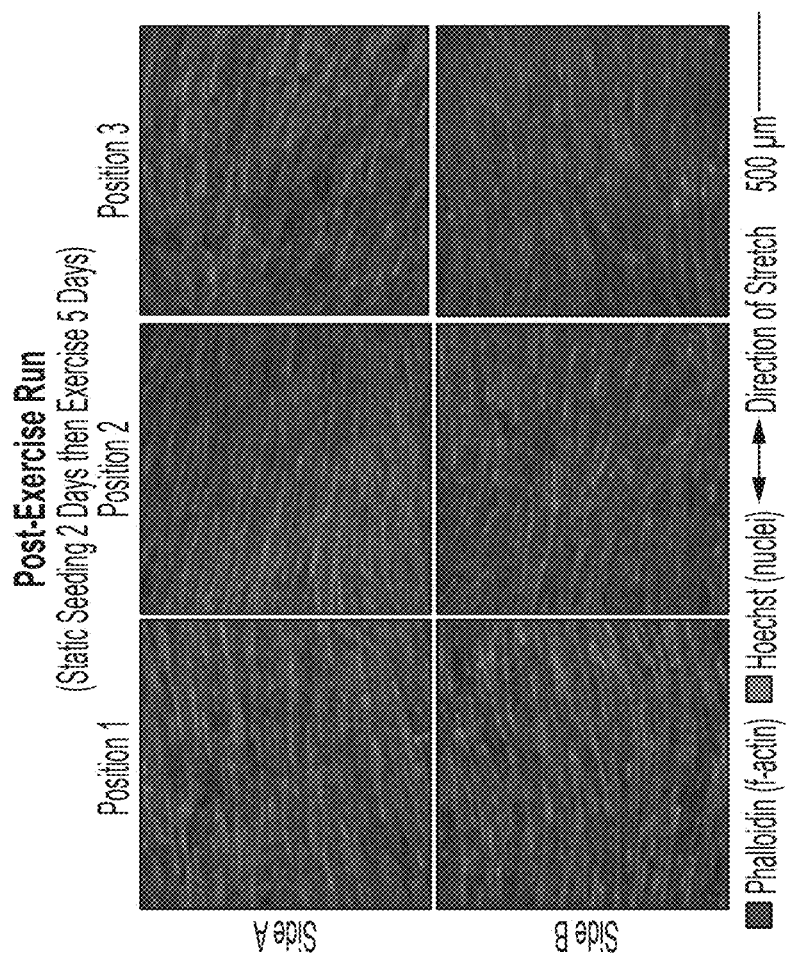
Figure 9C:
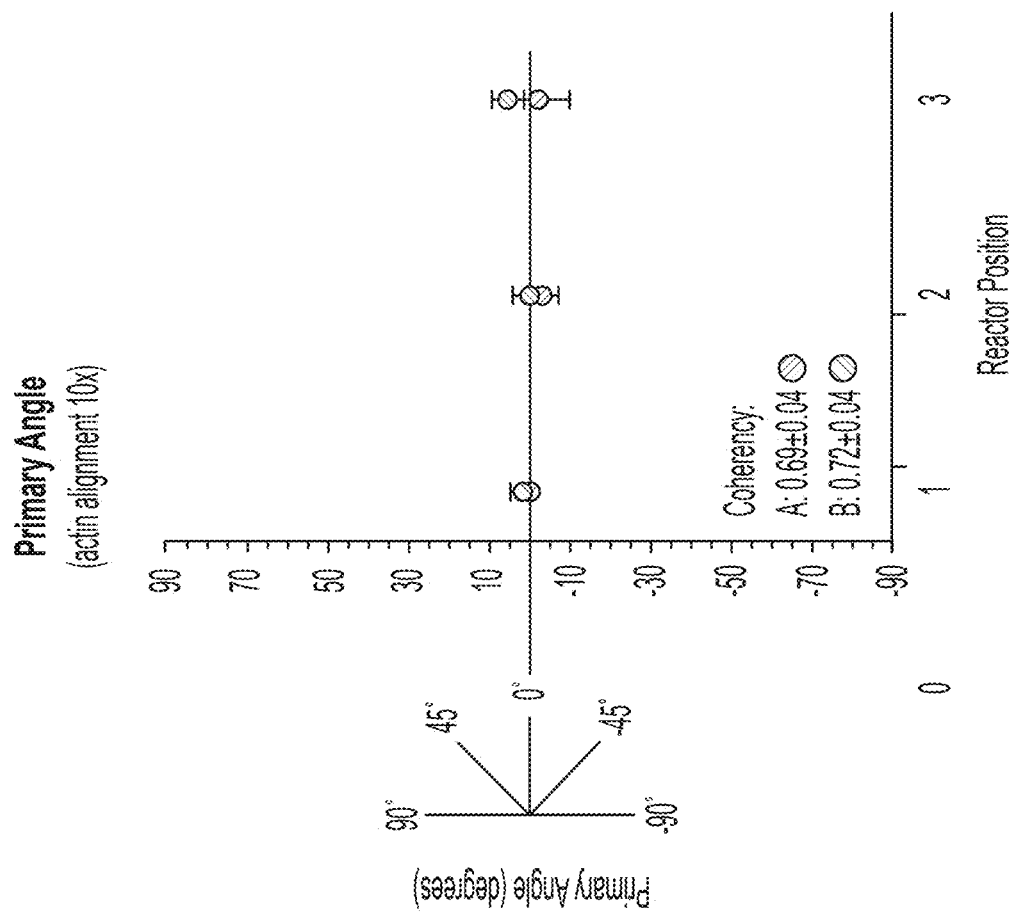

Referring now to FIGS. 9A-9C, shown are results from a human muscle progenitor test using three cartridges, two sides each, using the bioreactor system depicted in FIGS. 6 & 7. FIG. 9A is a pictorial illustration of the result of static seeding followed by five days of exercise. In FIG. 9A, actin is shown in red, the nuclei are shown in blue. FIGS. 9B and 9C are graphical illustrations of the results. In FIG. 9B, it can be seen that side A and side B coverages were measured to be approximately 96% on average, with sides A and B topping out at over 97% in the first and second positions, respectively. In FIG. 9C, it can be seen that the primary actin angle of alignment was within 5° for all cartridges/sides, and coherency of the actin alignment was consistently high (combined sides ~0.70).

Various alternatives and modifications can be devised by those skilled in the art without departing from the disclosure. Accordingly, the present disclosure is intended to embrace all such alternatives, modifications and variances. Additionally, while several example configurations of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular configurations. In addition, those skilled in the art will envision other modifications within the scope and spirit of the claims appended hereto. Other elements, steps, methods and techniques that are insubstantially different from those described above and/or in the appended claims are also intended to be within the scope of the disclosure.

The drawings are presented only to demonstrate certain examples of the disclosure. And, the drawings described are only illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B.

Furthermore, the terms "first", "second", "third," and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the example configurations of the disclosure described herein are capable of operation in other sequences and/or arrangements than are described or illustrated herein.

What is claimed is:

1. A system for exercising cells and tissues produced from said cells comprising:
   at least one cartridge having a cavity therein, said cartridge expandable in at least one dimension;
   at least one scaffold configured to hold the cells on at least one surface thereof, the at least one scaffold configured to rest within the cavity in the at least one cartridge;
   a flexible ring included in the at least one cartridge, said flexible ring retaining said at least one cartridge in an unexpanded position and retaining the cells within said cavity;
   a stretching means operably coupled to said at least one cartridge; and
   a bioreactor including a sealed enclosure, the sealed enclosure housing the at least one scaffold and the at least one cartridge, the bioreactor configured to enable seeding of the at least one scaffold with the cells, the seeding occurring within the sealed enclosure when the cartridge is in an unexpanded position.

2. The system as in claim 1 wherein the cells are selected from the group consisting of:
   immortalized murine myoblast cells (C2C12), muscle progenitor cells, hMP cells, NHCN-M2 cells, mesoangioblasts, satellite cells, H2K cells, L8 rat cells, 3T3 mouse embryonic fibroblasts, and combinations thereof.

3. The system as in claim 1 wherein the at least one cartridge comprises:
   a seeding inlet configured to distribute the cells onto the at least one surface of the at least one scaffold within the sealed enclosure.

4. The system as in claim 1 wherein the at least one cartridge comprises:
   channels configured to enable fluid flow to and from the at least one scaffold.

5. The system as in claim 1, the at least one cartridge prepared by a means further comprising:
   a compression means configured to provide compression to the at least one scaffold, the compression inhibiting silicone from invading the at least one surface of the at least one scaffold;
   a scaffold pinch configured to inhibit the silicone from invading the at least one surface;
   a silicone mold configured to provide a reservoir of the silicone for creating a shape of the at least one scaffold, the silicone mold including a table top, the table top configured to inhibit silicone from invading the at least one surface, the silicone mold configured to surround the at least one scaffold with the silicone, the silicone embedding a perimeter of the at least one scaffold forming sidewalls of a well having the at least one scaffold being a base of the well, the well holding the cells; and
   a tray configured to remove the at least one scaffold after the silicone has cured.

6. The system as in claim 1, the stretching means comprising:
   a frame configured to expand the at least one cartridge in the at least one dimension when a force is applied.

7. The system as in claim 1, the flexible ring comprising:
   a band surrounding the at least one cartridge, the flexible ring configured to seal the cavity of the at least one cartridge preventing loss of cells while the cells are seeded, the flexible ring bridging a separation when the cartridge is changed in said at least one dimension and urging said cartridge to return to its original dimension.

8. The system as in claim 1, the at least one scaffold comprising:
   an acellular matrix.

9. The system as in claim 1, the at least one scaffold comprising:
   a stretchable membrane.

10. The system as in claim 1, wherein the at least one scaffold is selected from the group consisting of: decellularized bovine bladder, decellularized porcine bladder, acellular matrix, decellularized collagen membrane, thin film polymer membrane, and polymer fiber membrane.

11. The system as in claim 1, wherein the at least one scaffold is framed in silicone.

12. The system as in claim 1, wherein the at least one surface is configured to accept the cells seeded onto the at least one scaffold within the sealed enclosure.

13. The system as in claim 1, further comprising:
   a gas permeable lid covering the bioreactor, the lid including at least one cell-seeding port.

14. The system as in claim 13, wherein the lid is formed from a transparent or semi-transparent material configured to enable observation of gas exchange between the at least one scaffold and a bioreactor environment within the bioreactor and observation of the scaffold and cells and tissue that are attached to it.

15. The system as in claim 13, wherein the lid is a solid or semi-solid structure.

16. The system as in claim 1, wherein the bioreactor further comprises:
   an inlet configured to admit media to the sealed enclosure.

17. The system as in claim 16, wherein the media is selected from the group consisting of: amino acids, vitamins, inorganic salts, glucose, a growth factor serum, hormones, attachment factors, dissolved gas and combinations thereof.

18. The system as in claim 1, wherein the bioreactor further comprises:
   a drain configured to drain waste products from the sealed enclosure.

19. The system as in claim 1, further comprising:
   a rotation means configured to rotate the bioreactor, the rotation means responding to commands from a controller.

20. The system as in claim 1, further comprising:
   a controller operably coupled to said system, said controller executing instructions for controlling a media supply, controlling cell seeding, controlling a rotation, controlling exercise, and controlling an interface with a manufacturing line.

21. The system as in claim 20 further comprising:
   electronic coupling between the manufacturing line and the controller.

22. The system as in claim 1, further comprising:
   a lockout brake configured to maintain the at least one cartridge in position after said at least one dimensional change.

23. The system as in claim 22, the lockout brake further comprising:
   two sections operably coupled to said at least one cartridge by a removable pin.

24. The system as in claim 1, the bioreactor further comprising:
   at least one environmental barrier protecting said sealed enclosure from environmental contamination.

25. The system as in claim 24, further comprising:
a push/pull mechanism configured to exercise the cells on said scaffold by exerting a force across the at least one environmental barrier onto the at least one cartridge causing said at least one dimensional change in the at least one cartridge and the at least one scaffold supported therein.

26. The system as in claim 25, wherein the force is a magnetic coupling force engaged by a linear actuator, the magnetic coupling providing transfer of the force across the at least one environmental barrier between the at least one scaffold and an exterior of the bioreactor.

27. The system as in claim 25, the push/pull mechanism further comprising:
a decoupling means configured to release the push/pull mechanism from the bioreactor.

28. The system as in claim 25, a force sensor measuring the resistance/stiffness of the tissue and initiating discontinuation of said exercise when said resistance/stiffness reaches a predetermined limit.

29. The system as in claim 1, further comprising:
a push/pull mechanism removably coupled with the bioreactor.

30. The system as in claim 1, further comprising:
durable components, the durable components capable of being sterilized and/or being multi-use.

31. The system as in claim 1, further comprising:
disposable components, the disposable components capable of being sterilized and/or being single-use.

\* \* \* \* \*